(12) United States Patent
Chen

(10) Patent No.: US 9,812,975 B2
(45) Date of Patent: Nov. 7, 2017

(54) RESONANT CONVERTER WITH CAPACITIVE MODE CONTROL AND ASSOCIATED CONTROL METHOD

(71) Applicant: Chengdu Monolithic Power Systems Co., Ltd., Chengdu (CN)

(72) Inventor: Yuedong Chen, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 15/272,418

(22) Filed: Sep. 21, 2016

(65) Prior Publication Data

US 2017/0093296 A1 Mar. 30, 2017

(30) Foreign Application Priority Data

Sep. 24, 2015 (CN) .......................... 2015 1 0613326

(51) Int. Cl.
*H02M 1/088* (2006.01)
*H02M 3/335* (2006.01)
*H02M 1/00* (2006.01)

(52) U.S. Cl.
CPC ....... *H02M 3/33546* (2013.01); *H02M 1/088* (2013.01); *H02M 2001/0009* (2013.01)

(58) Field of Classification Search
CPC ......... H02M 2001/0012; H02M 1/088; H02M 3/33507; H02M 3/33515; H02M 3/3353

USPC .......................... 363/21.02, 21.05, 21.13, 97
See application file for complete search history.

(56) References Cited

U.S. PATENT DOCUMENTS

| | | | | |
|---|---|---|---|---|
| 9,685,876 | B2 * | 6/2017 | Liu .................. | H02M 3/33546 |
| 2016/0087544 | A1 * | 3/2016 | Jin .......................... | H02M 1/32 363/21.02 |
| 2016/0190945 | A1 * | 6/2016 | Liu .................. | H02M 3/33546 363/17 |
| 2017/0093296 | A1 * | 3/2017 | Chen ................. | H02M 3/33546 |
| 2017/0110973 | A1 * | 4/2017 | Chen ................. | H02M 3/33546 |

* cited by examiner

*Primary Examiner* — Jeffrey Sterrett

(74) *Attorney, Agent, or Firm* — Perkins Coie LLP

(57) ABSTRACT

A control circuit used for controlling a resonant converter. The control circuit has a setting capacitor, N up thresholds and N low thresholds. If the resonant converter operates in the inductive mode, a setting voltage signal across the setting capacitor is respectively compared with the largest one of the N up thresholds and the smallest one of the N low thresholds in each operation cycle to generate a high-side control signal and a low-side control signal for controlling a high-side switch and a low-side switch of the resonant converter. If the resonant converter enters into the capacitive mode, the setting voltage signal is respectively compared with each of the N up thresholds and each of the N low thresholds operation cycle by operation cycle to generate the high-side control signal and the low-side control signal.

20 Claims, 13 Drawing Sheets

RESONANT CONVERTER WITH CAPACITIVE MODE CONTROL AND ASSOCIATED CONTROL METHOD

CROSS-REFERENCE TO RELATED APPLICATION

This application claims the benefit of CN application No. 201510613326.6, filed on Sep. 24, 2015, and incorporated herein by reference.

TECHNICAL FIELD

The present invention generally refers to electrical circuit, and more particularly but not exclusively refers to control circuit of resonant converter.

BACKGROUND

LLC resonant converters are widely employed in switching power supply due to the use of soft-switch technique, high efficiency and other advantages.

FIG. 1 illustrates a prior art half-bridge LLC resonant converter 50A. As shown in FIG. 1, the resonant converter 50A comprises a square-wave generator 501, a resonant network 502, an isolated transformer T, a rectifier network and a load. The square-wave generator 501 is illustrated as to have a half-bridge topology comprising a high-side switch M1 and a low-side switch M2 connected in series between a positive terminal and a negative terminal of a DC power supply VIN. Herein, the high-side switch M1 is controlled by a high-side control signal VG1, and the low-side switch M2 is controlled by a low-side control signal VG2 which has the same duty cycle as the high-side control signal VG1. Ideally, this duty cycle is 0.5. The square-wave generator 501 converts the DC power supply VIN to a square-wave signal VSW by controlling the high-side switch M1 and the low-side switch M2 to switch on and off in a complementary manner.

The resonant network 502 is illustrated as a LLC resonant network having a resonant inductor Lr, a resonant inductor Lm and a resonant capacitor Cr, wherein the resonant inductor Lm is connected in parallel with a primary winding of the isolated transformer T. Generally, the resonant inductor Lm is a field winding. The resonant network 502 converts the square-wave signal VSW to an AC (Alternating Current) voltage signal.

The rectifier network is coupled between a secondary winding of the isolated transformer T and the load. The rectifier network converts the AC voltage signal to an output voltage signal VOUT.

The half-bridge LLC resonant converter 50A further includes a control circuit comprising a voltage sensing circuit, a current sensing circuit, a mode judging circuit and a frequency controller. The voltage sensing circuit senses the output voltage signal VOUT to generate a feedback voltage signal VFB which is indicative of the output voltage signal VOUT. The current sensing circuit senses a current Ir flowing through the resonant inductor Lr to generate a current sense signal VCS. Usually, the current sense signal VCS is a voltage signal which is indicative of the current Ir. The mode judging circuit receives the current sense signal VCS, and compares the current sense signal VCS with a threshold to generate a mode signal MC which is used to indicate whether the half-bridge LLC resonant converter 50A operates in an inductive mode or a capacitive mode. The frequency controller receives the feedback voltage signal VFB and the mode signal MC, and generates the high-side control signal VG1 and the low-side control signal VG2 based on the feedback voltage signal VFB and the mode signal MC.

The LLC resonant converter 50A regulates the output voltage signal VOUT by changing its switching frequency, i.e., changing the switching frequency of the high-side switch M1 and the switching frequency of the low-side switch M2, wherein the switching frequency of the high-side switch M1 is the same as the switching frequency of the low-side switch M2.

As can be appreciated, the LLC resonant converter 50A is able to operate in the capacitive mode or the inductive mode depending on its switching frequency. Generally, in order to realize a function of Zero Voltage Switching (ZVS), the LLC resonant converter 50A should be controlled to operate in the inductive mode. If the LLC resonant converter 50A enters into the capacitive mode, it cannot realize the function of ZVS, which can cause the high-side switch M1 and the low-side switch M2 to be damaged.

FIG. 2 illustrates schematic waveform diagrams 50B of the resonant converter 50A in the inductive mode. As shown in FIG. 2, the current Ir lags behind the square wave signal VSW. Thus, the resonant converter 50A works in the inductive mode, in which the high-side switch M1 and the low-side switch M2 can be turned on at a zero voltage stress.

Generally, when the resonant converter 50A enters into the capacitive mode, the frequency controller of the control circuit will increase the switching frequency of the resonant converter 50A for exiting the capacitive mode. FIG. 3 illustrates a prior art frequency controller 50C, and FIG. 4 illustrates an operation waveform diagram 50D of the LLC resonant converter 50A controlled by the prior art frequency controller 50C of FIG. 3. Referring to FIG. 3 and FIG. 4, when the resonant converter 50A enters into the capacitive mode, a soft-start capacitor CSS will be discharged through turning a soft-start switch MSS on in response to the mode signal MC. Subsequently, an increasing rate and a decreasing rate of a setting voltage VCT across a setting capacitor CT are increased so that the switching frequency of the resonant converter 50A is increased. See FIG. 4, the switching cycle of the resonant converter 50A is decreased from T0 to T1 after the soft-start switch MSS is turned on.

Although increasing the switching frequency of the resonant converter 50A as described above can make the resonant converter 50A return to the inductive mode from the capacitive mode, it is still desired to improve the response speed of the resonant converter 50A for returning back to the inductive mode once it enters into the capacitive mode.

SUMMARY

Embodiments of the present invention are directed to a control method used for controlling a resonant converter, wherein the resonant converter comprises a setting capacitor used for regulating a switching frequency of the resonant converter, the control method comprising: sensing a current flowing through a resonant inductor of the resonant converter to generate a current sense signal; judging whether the resonant converter operates in an inductive mode or a capacitive mode based on the current sense signal; providing N up thresholds and N low thresholds, wherein each of the N up thresholds is corresponding to each of the N low thresholds, and wherein each of the N up thresholds is higher than each of the N low thresholds correspondingly, and wherein N is a positive integer and is larger than or equal to 2; when the resonant converter operates in the inductive mode, comparing a setting voltage signal across the setting capacitor with the largest one of the N up thresholds, and with the smallest one of the N low thresholds in each operation cycle to generate a high-side control signal and a low-side control signal respectively used for controlling a high-side switch and a low-side switch of the resonant converter, wherein the operation cycle comprises one or more switching cycles of the resonant converter; when the resonant converter operates in the capacitive mode, comparing the setting voltage signal with each of the N up thresholds sequentially operation cycle by operation cycle, and with each of the N low thresholds sequentially operation cycle by operation cycle to generate the high-side control signal and the low-side control signal; and changing the switching frequency of the resonant converter by varying the N up thresholds and the N low thresholds.

Embodiments of the present invention are further directed to a control circuit used for controlling a resonant converter, comprising: a voltage sensing circuit, configured to sense an output voltage signal of the resonant converter to generate a feedback voltage signal; a current sensing circuit, configured to sense a current flowing through a resonant inductor of the resonant converter to generate a current sense signal; a mode judging circuit, configured to receive the current sense signal, and further configured to compare the current sense signal with a zero-crossing threshold to generate a mode signal, wherein the mode signal is configured to judge whether the resonant converter operates in an inductive mode or a capacitive mode; and a frequency controller, configured to receive the mode signal and the feedback voltage signal, and further configured to generate a high-side control signal and a low-side control signal respectively used for controlling a high-side switch and a low-side switch of the resonant converter based on the feedback voltage signal and the mode signal, wherein the frequency controller comprises a setting capacitor, and wherein the frequency controller further comprises N up thresholds and N low thresholds, and wherein each of the N up thresholds is corresponding to each of the N low thresholds, and wherein each of the N up thresholds is higher than each of the N low thresholds correspondingly, and wherein N is a positive integer and is larger than or equal to 2, and wherein when the resonant converter operates in the inductive mode, the frequency controller is configured to compare a setting voltage signal across the setting capacitor with the largest one of the N up thresholds, and with the smallest one of the N low thresholds in each operation cycle to generate the high-side control signal and the low-side control signal, wherein the operation cycle comprises one or more switching cycles of the resonant converter, and wherein when the resonant converter enters into the capacitive mode, the frequency controller is configured to compare the setting voltage signal with each of the N up thresholds sequentially operation cycle by operation cycle, and with each of the N low thresholds sequentially operation cycle by operation cycle to generate the high-side control signal and the low-side control signal, and wherein the frequency controller is further configured to change a switching frequency of the resonant converter by varying the N up thresholds and the N low thresholds.

Embodiments of the present invention are further directed to a resonant converter, comprising: a square-wave generator having a high-side switch and a low-side switch, configured to convert a power supply to a square-wave signal by controlling the high-side switch and the low-side switch on and off in a complementary manner; an isolated transformer; a resonant network including a first resonant inductor, a second resonant inductor and a resonant capacitor, configured to convert the square-wave signal to an alternating current voltage signal; a rectifier network coupled between a secondary winding of the isolated transformer and a load, and configured to convert the alternating current voltage signal to an output voltage signal; and a control circuit comprising a setting capacitor, N up thresholds and N low thresholds, wherein each of the N up thresholds is corresponding to each of the N low thresholds, and wherein each of the N up thresholds is higher than each of the N low thresholds correspondingly, and wherein N is a positive integer and is larger than or equal to 2, and wherein when the resonant converter operates in the inductive mode, the control circuit is configured to compare a setting voltage signal across the setting capacitor with the largest one of the N up thresholds, and with the smallest one of the N low thresholds in each switching cycle to generate a high-side control signal and a low-side control signal used for controlling the high-side switch and the low-side switch, wherein the operation cycle comprises one or more switching cycles of the resonant converter, and wherein when the resonant converter enters into the capacitive mode, the control circuit is configured to compare the setting voltage signal with each of the N up thresholds operation cycle by operation cycle, and compared with each of the N low thresholds operation cycle by operation cycle, and wherein the control circuit is further configured to change a switching frequency of the resonant converter by varying the N up thresholds and the N low thresholds.

BRIEF DESCRIPTION OF THE DRAWINGS

Non-limiting and non-exhaustive embodiments are described with reference to the following drawings.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The term "couple" includes direct connection and indirect connection. For instance, indirect connection includes connection through conductor which has resistance and/or parasitic parameters such as inductance and capacitance, or connection through diode, and so on.

In the present application, a control circuit configured to control a resonant converter may be presented. The control circuit may comprise a frequency controller for controlling a switching frequency of the resonant converter.

Figure 1:
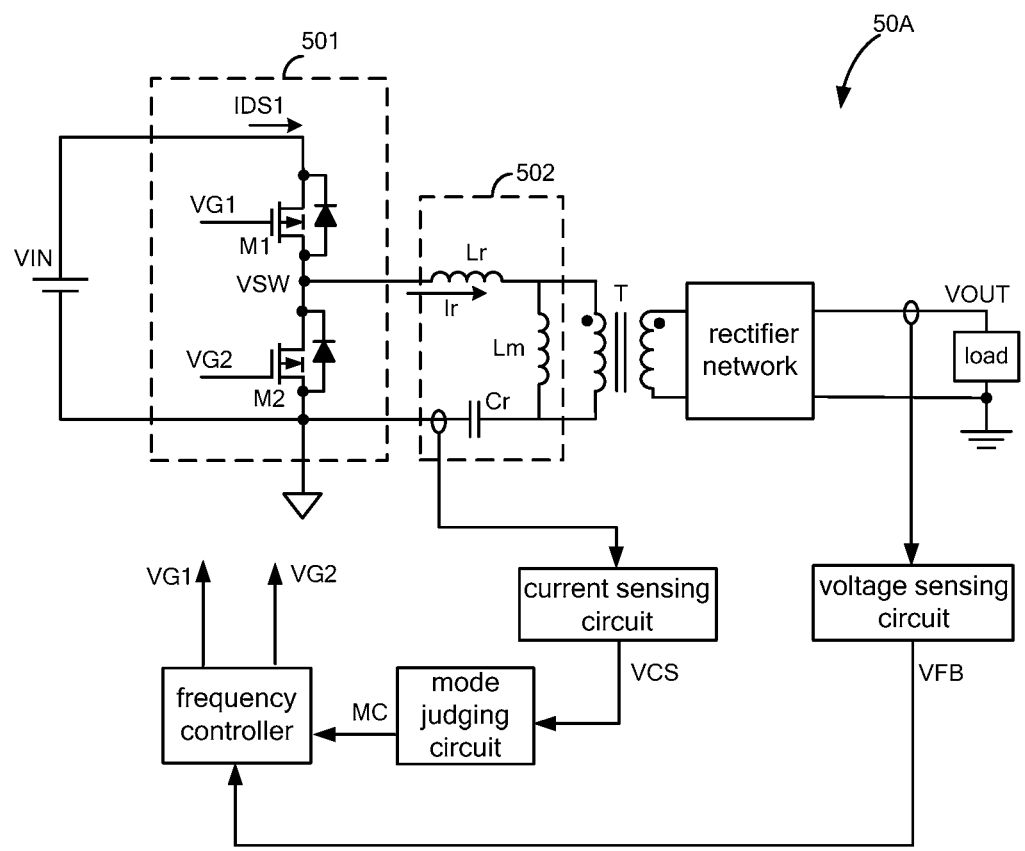
FIG. 1 illustrates a prior art half-bridge LLC resonant converter 50A.
Figure 2:
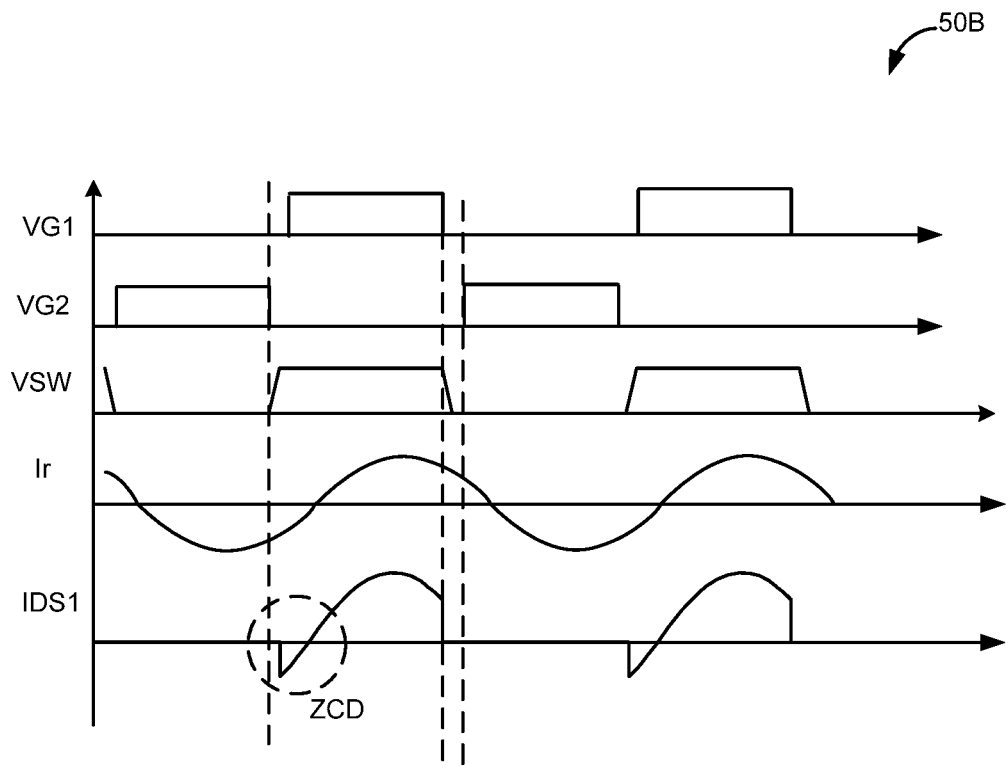
FIG. 2 illustrates schematic waveform diagrams 50B of the resonant converter 50A in the inductive mode.
Figure 5:
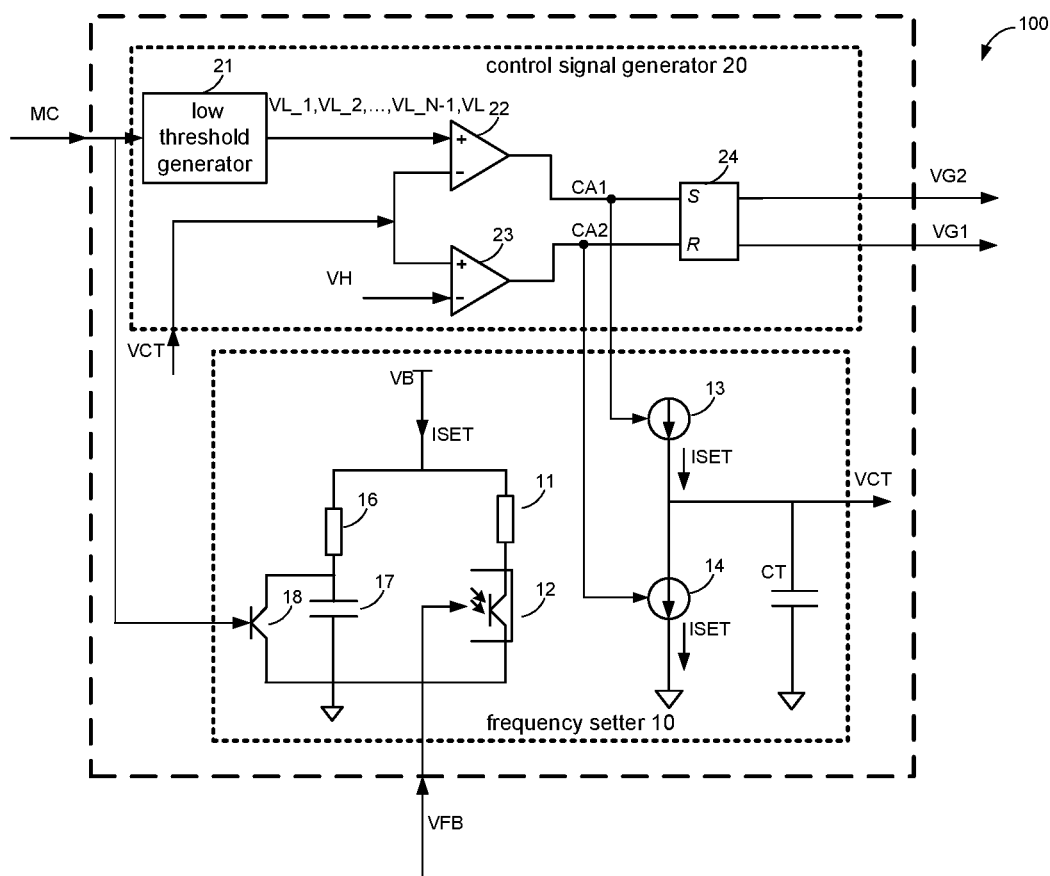
FIG. 5 schematically illustrates a frequency controller 100 in accordance with an embodiment of the present invention.

FIG. 5 schematically illustrates a frequency controller 100 in accordance with an embodiment of the present invention. As shown in FIG. 5, the frequency controller 100 may comprise an up threshold VH and N low thresholds, i.e., a first low threshold VL_1, a second low threshold VL_2, . . . , a $N^{th}$ low threshold VL_N, wherein N is a positive integer which is larger than or equal to 2. The frequency controller 100 may have a first input terminal, a second input terminal, a first output terminal and a second output terminal. The first input terminal of the frequency controller 100 may be configured to receive a mode signal MC, and the second input terminal of the frequency controller 100 may be configured to receive a feedback voltage signal VFB. As can be appreciated by one of ordinary skill in the art, the mode signal MC and the feedback voltage signal VFB may be generated by prior art modules such as the mode judging circuit and the voltage sensing circuit described with reference to FIG. 1. Here, the mode signal MC may be a logic signal having a first logic state (e.g. logic high state) which indicates that the resonant converter operates in a capacitive mode, and a second logic state (e.g. logic low state) which indicates that the resonant converter operates in an inductive mode.

The frequency controller 100 may be configured to generate a high-side control signal VG1 and a low-side control signal VG2 based on the feedback voltage signal VFB and the mode signal MC, wherein the high-side control signal VG1 and the low-side control signal VG2 may be logic complementary signals having the same duty cycle. Ideally, this duty cycle may be regulated at a constant value 0.5. Both of the high-side control signal VG1 and the low-side control signal VG2 may have a first logic state (e.g. logic high state) and a second logic state (e.g. logic low state). In an embodiment, when the high-side control signal VG1 has the first logic state, a high-side switch M1 of the resonant converter may be turned on. When the high-side control signal VG1 has the second logic state, the high-side switch M1 may be turned off. In an embodiment, when the low-side control signal VG2 has the first logic state, a low-side switch M2 of the resonant converter may be turned on. When the low-side control signal VG2 has the second logic state, the low-side switch M2 may be turned off. Moreover, a frequency of the high-side control signal VG1 and a frequency of the low-side control signal VG2 may be varied in accordance with various load conditions. As can be appreciated, the frequency of the high-side control signal VG1 is the same as the frequency of the low-side control signal VG2, which is indicative of the switching frequency of the resonant converter. The resonant converter may be configured to regulate a DC power supply VIN to an output voltage signal VOUT by varying its switching frequency. In an embodiment, when the feedback voltage signal VFB is lower than a reference voltage signal, the frequency controller 100 may be configured to decrease the switching frequency of the resonant converter. And when the feedback voltage signal VFB is higher than the reference voltage signal, the frequency controller 100 may be configured to increase the switching frequency of the resonant converter. Furthermore, when the resonant converter enters into a conductive mode, the frequency controller 100 may be configured to increase the switching frequency of the resonant converter. In an embodiment, the frequency controller 100 may comprise a frequency setter 10 and a control signal generator 20.

In the exemplary embodiment of FIG. 5, the frequency setter 10 may have an input terminal configured to receive the feedback voltage signal VFB, and an output terminal. The frequency setter 10 may be configured to generate a source current and a sink current to charge and discharge a setting capacitor CT for generating a setting voltage VCT at its output terminal, wherein the charging rate of the setting capacitor CT is the same as the discharging rate of the setting capacitor CT. In an embodiment, the frequency setter 10 may comprise a resistor 11, a variable resistor 12, a first mirror current source 13, a second mirror current source 14 and the setting capacitor CT. In another embodiment, the setting capacitor CT as an independent module may be provided from outside of the frequency controller 100. For example, in a monolithic Integrated Circuit (IC) application, the resistor 11, the variable resistor 12, the first mirror current source 13 and the second mirror current source 14 can be integrated in the monolithic IC while the setting capacitor CT may be provided from outside of the monolithic IC.

In the exemplary embodiment of FIG. 5, the resistor 11 and the variable resistor 12 may be connected in series between a DC supply voltage VB and a logic ground. A first current signal ISET may flow through the resistor 11 and the variable resistor 12 from the DC supply voltage VB to the logic ground. In an embodiment, the variable resistor 12 may have a control terminal configured to receive the feedback voltage signal VFB. The resistance of the variable resistor 12 may be varied in accordance with the variation of the feedback voltage signal VFB, i.e., the resistance of the variable resistor 12 may be varied in accordance with the variation of the load of the resonant converter. Consequently, the first current signal ISET may be varied in response to the variation of the load of the resonant converter. For instance, if the output voltage signal VOUT may decrease in response to an increased load of the resonant converter, the switching frequency of the resonant converter will decrease in order to keep the output voltage signal VOUT at a predetermined value. For this situation, the resistance of the variable resistor 12 may increase so as to decrease the first current signal ISET. In the exemplary embodiment of FIG. 5, the variable resistor 12 is illustrated as an optic-coupler. In another embodiment, the variable resistor 12 can also be other suitable devices with a variable resistance that can be controlled by the feedback voltage signal VFB.

The first mirror current source 13 may be configured to mirror the first current signal ISET to generate the source current. In the exemplary embodiment of FIG. 5, when the setting voltage VCT is lower than any one of the N low thresholds (VL_1, VL_2, . . . , VL_N), the source current may be configured to charge the setting capacitor CT. The second mirror current source 14 may be configured to mirror the first current signal ISET to generate the sink current. In the exemplary embodiment of FIG. 5, when the setting voltage VCT is higher than the up threshold VH, the sink current may be configured to discharge the setting capacitor CT. In the exemplary embodiment of FIG. 5, the setting capacitor CT may be connected between the logic ground and a common connection of the first mirror current source 13 and the second mirror current source 14. In the exemplary embodiment of FIG. 5, both of the source current and the sink current may be equal to the first current signal ISET. In another embodiment, the first mirror current source 13 may be configured to provide the source current during the whole operation process of the resonant converter, while the second mirror current source 14 may be configured to provide the sink current during the high-side switch M1 turns off. In this case, the source current may be equal to the first current signal ISET, and the sink current may be twice of the first current signal ISET (2*ISET).

Figure 3:
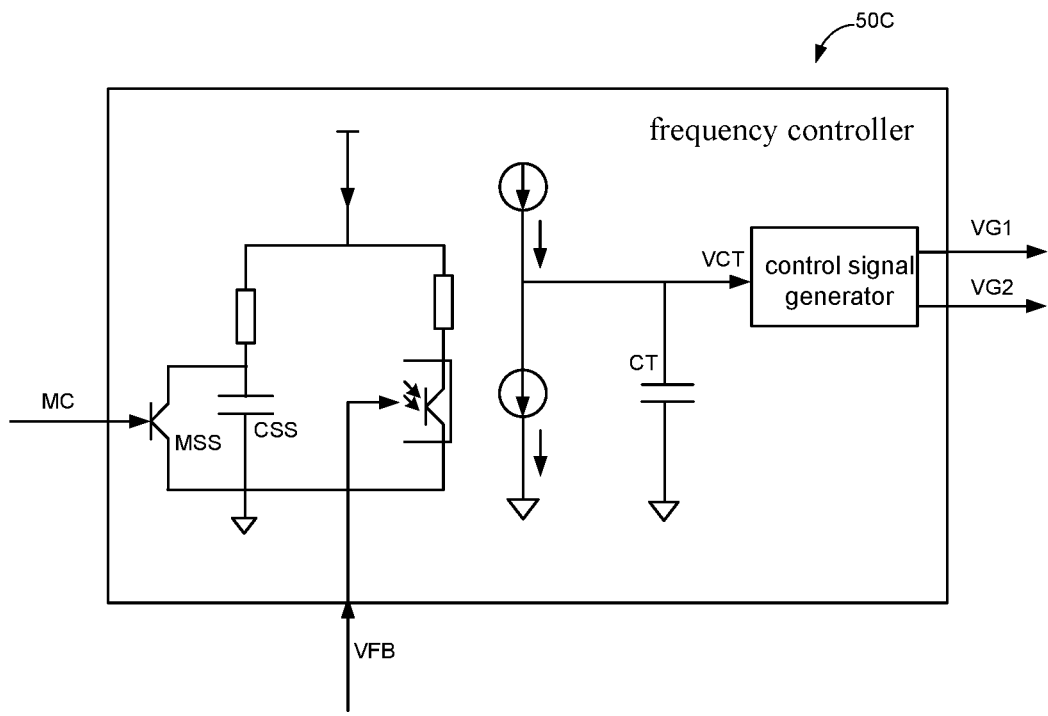
FIG. 3 illustrates a prior art frequency controller 500.
Figure 4:
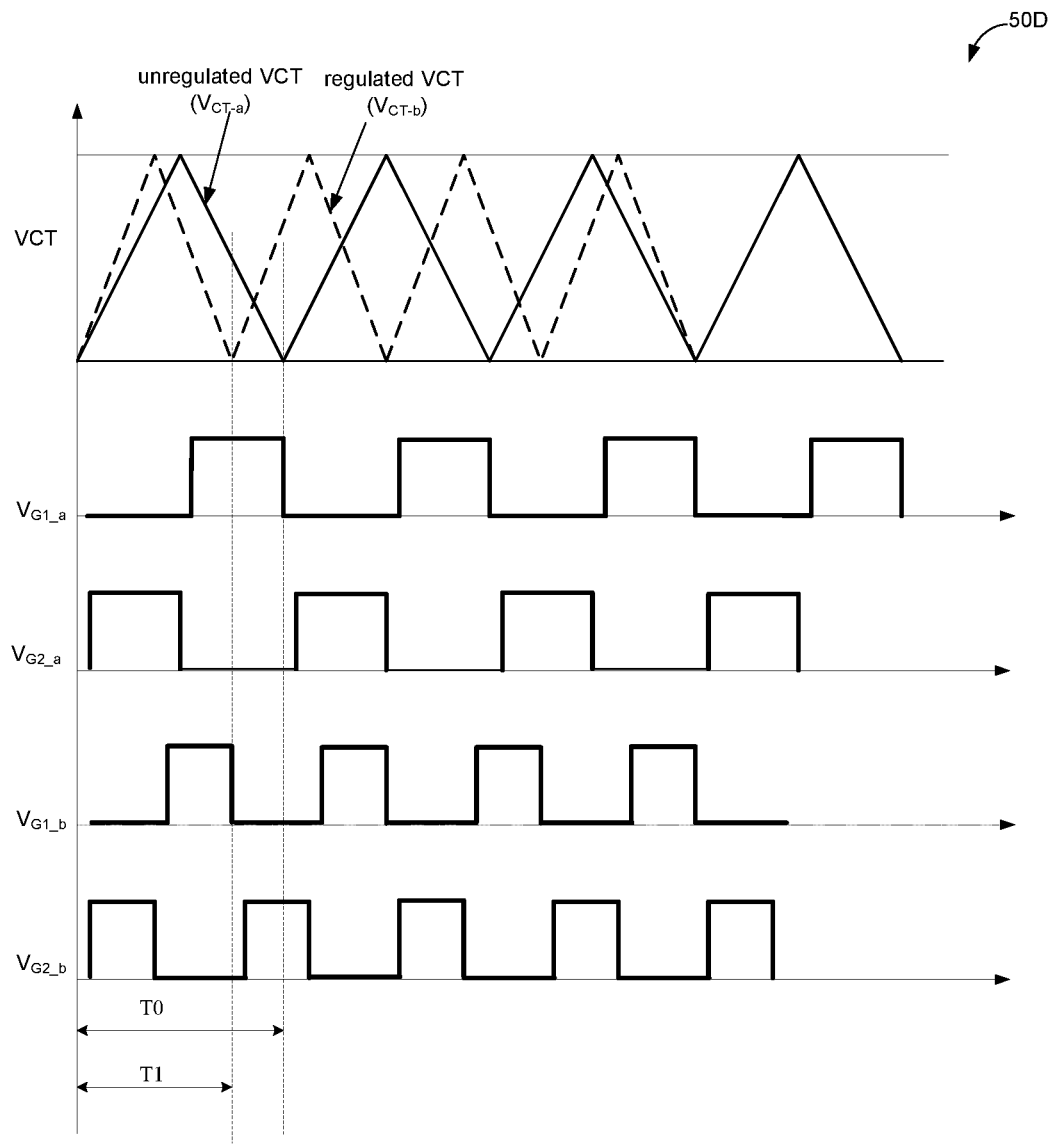
FIG. 4 illustrates an operation waveform diagram 50D of a LLC resonant converter 50A controlled by the prior art frequency controller 50C of FIG. 3.

In another embodiment, the frequency setter 10 may further comprise a soft-start module including a soft-start resistor 16, a soft-start capacitor 17 and a soft-start switch 18. The soft-start resistor 16 and the soft-start capacitor 17 may also be connected in series between the DC supply voltage VB and the logic ground. The soft-start switch 18 may have a first terminal, a second terminal and a control terminal. The first terminal and the second terminal of the soft-start switch 18 may correspondingly be connected to a first terminal and a second terminal of the soft-start capacitor 17, and the control terminal of the soft-start switch 18 may be configured to receive the mode signal MC. For this embodiment, the soft-start resistor 16 and the soft-start capacitor 17 may coact with the resistor 11 and the variable resistor 12 to generate the first current signal ISET. Therefore, a larger first current signal ISET can be obtained during the startup stage of the resonant converter so that the resonant converter can be started up with a higher switching frequency. Furthermore, when the resonant converter enters into the capacitive mode, the mode signal MC may be configured to turn the soft-start switch 18 on so that the soft-start capacitor 17 may be discharged by the soft-start switch 18 (as described with reference to FIG. 3). The first current signal ISET may further be increased so as to increase the switching frequency of the resonant converter. The resonant converter may quickly transit from the capacitive mode to the inductive mode. In another embodiment, the soft-start resistor 16 and the soft-start capacitor 17 may be combined as an independent module that can be provided from outside of the frequency controller 100. For instance, in a monolithic IC application, the soft-start switch 18 can be integrated in the monolithic IC while the soft-start resistor 16 and the soft-start capacitor 17 may be provided from outside of the monolithic IC.

In the exemplary embodiment of FIG. 5, the control signal generator 20 may comprise a first input terminal configured to receive the mode signal MC, a second input terminal configured to receive the setting voltage signal VCT, a first output terminal and a second output terminal. The control signal generator 20 may be configured to generate the N low thresholds (VL_1, VL_2, . . . , VL_N) based on the mode signal MC. For better explaining the various embodiments of the control signal generator 20, an operation cycle of the control signal generator 20 may be defined in an embodiment as to be equal to one switching cycle of the resonant converter, while in alternative embodiments, as to be equal to a plurality of the switching cycles of the resonant converter. The control signal generator 20 may further be configured to compare the setting voltage signal VCT with the up threshold VH in each operation cycle of the resonant converter, and meanwhile to compare the setting voltage signal VCT with each of the N low thresholds (VL_1, VL_2, . . . , VL_N) sequentially operation cycle by operation cycle so as to generate the high-side control signal VG1 and the low-side control signal VG2 at its first and second output terminals. For instance, in a first operation cycle, the setting voltage signal VCT may respectively be compared with the first low threshold VL_1 and the up threshold VH; in a second operation cycle, the setting voltage signal VCT may respectively be compared with the second low threshold VL_2 and the up threshold VH, and so forth. In an embodiment, the control signal generator 20 may comprise a low threshold generator 21, a first comparing circuit 22, a second comparing circuit 23 and a logic circuit 24.

The low threshold generator 21 may comprise an input terminal configured to receive the mode signal MC, and N output terminals. The low threshold generator 21 may be configured to correspondingly generate the N low thresholds (VL_1, VL_2, . . . , VL_N) at the N output terminals, and further configured to select one of the N output terminals to be activated during each switching cycle of the resonant converter, i.e., only one of the N low thresholds (VL_1, VL_2, . . . , VL_N) may be provided by the low threshold generator 21 during each switching cycle of the resonant converter. In an embodiment, when the resonant converter operates in the inductive mode, the low threshold generator 21 may be configured to only provide the $N^{th}$ low threshold VL_N during the whole inductive mode period. In another embodiment, when the resonant converter operates in the capacitive mode, the low threshold generator 21 may be configured to provide the N low thresholds (VL_1, VL_2, . . . , VL_N) operation cycle by operation cycle, wherein the up threshold VH is higher than each of the N low thresholds (VL_1, VL_2, . . . , VL_N). In an embodiment, the N low thresholds (VL_1, VL_2, . . . , VL_N) may be decreased operation cycle by operation cycle, e.g., the first low threshold VL_1 may be higher than the second low threshold VL_2, the second low threshold VL_2 may be higher than the third low threshold VL_3, . . . , and the $N^{th}$ low threshold VL_N may be the smallest one. The switching frequency of the resonant converter can be varied by changing the N low thresholds (VL_1, VL_2, . . . , VL_N).

The first comparing circuit 22 may have a first input terminal configured to receive the N low thresholds (VL_1, VL_2, . . . , VL_N) operation cycle by operation cycle, a second input terminal configured to receive the setting voltage signal VCT, and an output terminal. The first comparing circuit 22 may be configured to compare the setting voltage signal VCT with each of the N low thresholds (VL_1, VL_2, ..., VL_N) sequentially operation cycle by operation cycle so as to provide a first comparing signal CA1. In an embodiment, the first comparing circuit 22 may comprise a comparator, the non-inverting (+) input terminal of the comparator may be operated as the first input terminal of the first comparing circuit 22, and the inverting (−) input terminal of the comparator may be operated as the second input terminal of the first comparing circuit 22.

The second comparing circuit 23 may have a first input terminal configured to receive the setting voltage signal VCT, a second input terminal configured to receive the up threshold VH, and an output terminal. The second comparing circuit 23 may be configured to compare the setting voltage signal VCT with the up threshold VH to provide a second comparing signal CA2. In an embodiment, the second comparing circuit 23 may comprise a comparator, the non-inverting (+) input terminal of the comparator may be operated as the first input terminal of the second comparing circuit 23, and the inverting (−) input terminal of the comparator may be operated as the second input terminal of the second comparing circuit 23.

The logic circuit 24 may have a first input terminal configured to receive the first comparing signal CA1, a second input terminal configured to receive the second comparing signal CA2, and an output terminal. The logic circuit 24 may be configured to conduct a logic operation to the first comparing signal CA1 and the second comparing signal CA2 to provide the high-side control signal VG1 and the low-side control signal VG2. In an embodiment, the logic circuit 24 may comprise a RS flip-flop, the set terminal (S) of the RS flip-flop may be operated as the first input terminal of the logic circuit 24, and the reset terminal (R) of the RS flip-flop may be operated as the second input terminal of the logic circuit 24.

When the setting voltage VCT is higher than the up threshold VH, the logic state of the high-side control signal VG1 may change from the second logic state to the first logic state, and the logic state of the low-side control signal VG2 may change from the first logic state to the second logic state. When the setting voltage VCT is lower than any one of N low thresholds (VL_1, VL_2, ..., VL_N), the logic state of the high-side control signal VG1 may change from the first logic state to the second logic state, and the logic state of the low-side control signal VG2 may change from the second logic state to the first logic state.

Furthermore, in the exemplary embodiment of FIG. 5, a control terminal of the first mirror current source 13 may be coupled to the output terminal of the first comparing circuit 22 to receive the first comparing signal CA1 for controlling the charging of the setting capacitor CT. A control terminal of the second mirror current source 14 may be coupled to the output terminal of the second comparing circuit 23 to receive the second comparing signal CA2 for controlling the discharging of the setting capacitor CT. In another embodiment, the first comparing circuit 22 and the second comparing circuit 23 may be replaced with a hysteresis comparator.

Figure 6:
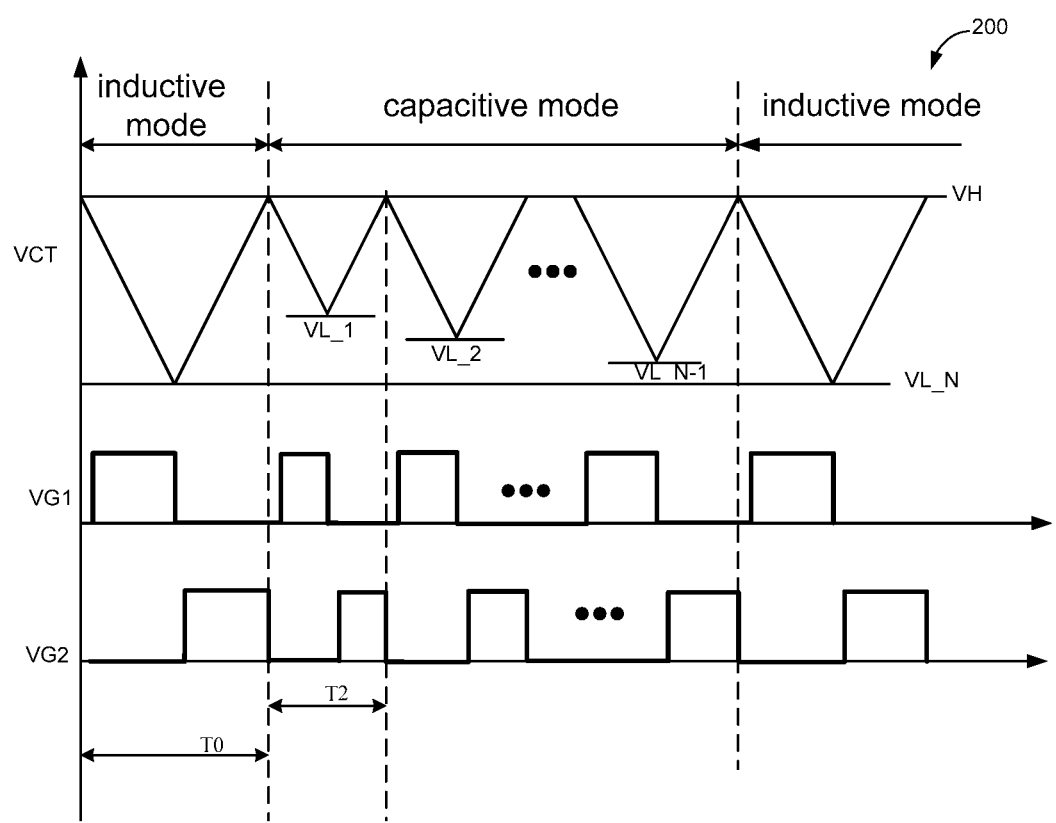
FIG. 6 illustrates an operation waveform diagram 200 of a LLC resonant converter controlled by the frequency controller 100 of FIG. 5 in accordance with an embodiment of the present invention.

FIG. 6 illustrates an operation waveform diagram 200 of a LLC resonant converter controlled by the frequency controller 100 of FIG. 5 in accordance with an embodiment of the present invention. As shown in FIG. 6, when the resonant converter operates in the inductive mode, the setting voltage signal VCT may be compared with the $N^{th}$ low threshold VL_N, and with the up threshold VH respectively to provide the high-side control signal VG1 and the low-side control signal VG2. When the resonant converter operates in the capacitive mode, the setting voltage signal VCT may be compared with each of the N low thresholds (VL_1, VL_2, ..., VL_N) sequentially operation cycle by operation cycle, and be compared with the higher threshold VH so as to provide the high-side control signal VG1 and the low-side control signal VG2. As shown in FIG. 6, both of the frequency of the high-side control signal VG1 and the frequency of the low-side control signal VG2 may be increased observably, and the switching cycle of the resonant converter may be decreased from T0 to T2 (T0→T2). Thus, the resonant converter can have a quick dynamic response for exiting the capacitive mode. Furthermore, it should be noted that the waveform diagram 200 is illustrated for an embodiment of the operation of the frequency controller 100 of FIG. 5, wherein the frequency setter 10 may operate without the soft-start resistor 16, the soft-start capacitor 17 and the soft-start switch 18. If the frequency controller 100 operates with the soft-start resistor 16, the soft-start capacitor 17 and the soft-start switch 18 in the capacitive mode, the soft-start capacitor 17 will be discharged by the soft-start switch 18 when the resonant converter enters into the capacitive mode. Accordingly, the frequency of the high-side control signal VG1 and the frequency of the low-side control signal VG2 may become higher than that without the discharging of the soft-start capacitor 17 in the capacitive mode. Thus, a quick dynamic response of the resonant converter in the capacitive mode may be obtained. In an embodiment, the dynamic response of the resonant converter can be changed by varying the first low threshold VL_1. Generally, the larger the first low threshold VL_1 is, the higher the dynamic response can be. Appropriately choosing the second low threshold VL_2, the third low threshold VL_3, ..., the $N^{th}$ low threshold VL_N can contribute a smoothly transition from the capacitive mode to the indicative mode.

Figure 7:
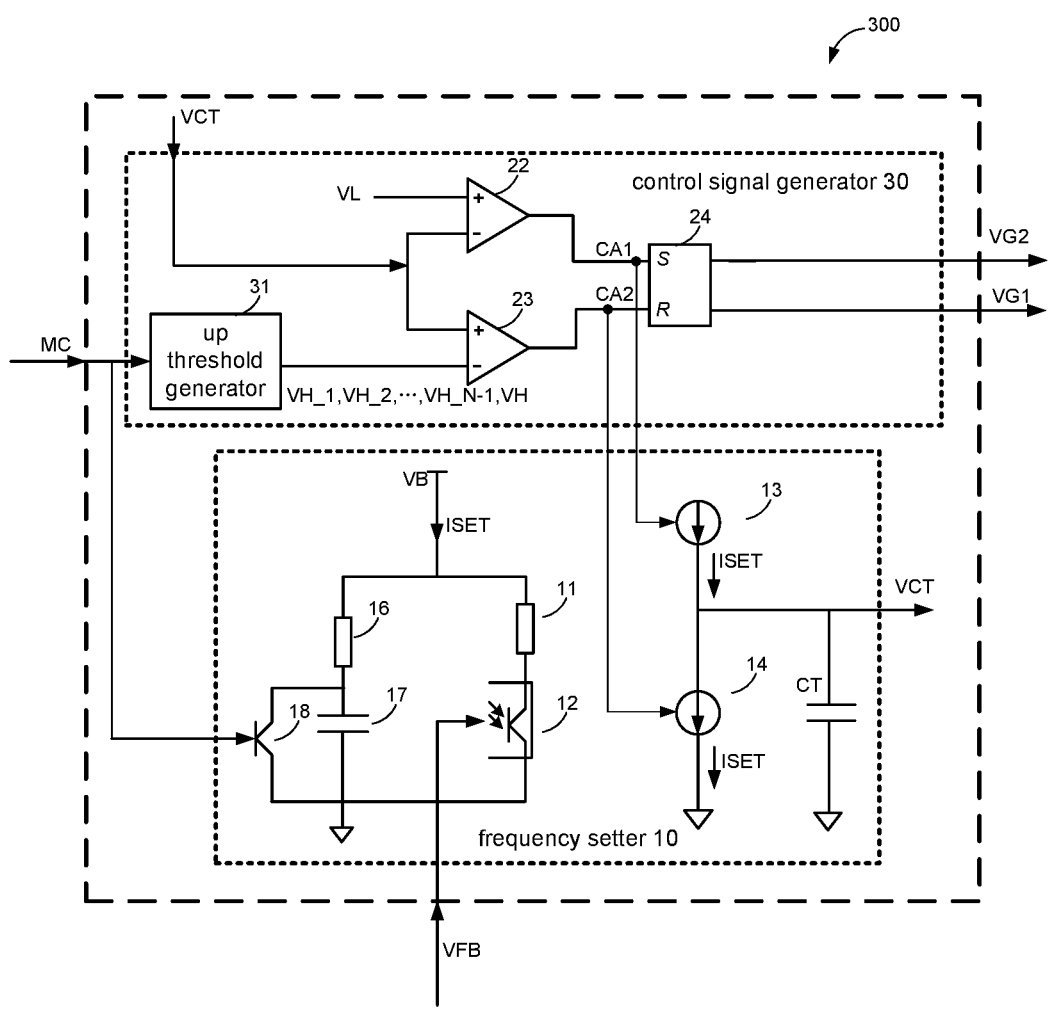
FIG. 7 schematically illustrates a frequency controller 300 in accordance with an embodiment of the present invention.

FIG. 7 schematically illustrates a frequency controller 300 in accordance with an embodiment of the present invention. Compared to the frequency controller 200 of FIG. 5, the frequency controller 300 of FIG. 7 may comprise a control signal generator 30 used to replace the control signal generator 20 of FIG. 5.

In the exemplary embodiment of FIG. 7, the control signal generator 30 may comprise a first input terminal configured to receive the mode signal MC, a second input terminal configured to receive the setting voltage signal VCT, a first output terminal and a second output terminal. The control signal generator 30 may be configured to generate N up thresholds: a first up threshold VH_1, a second up threshold VH_2, ..., a $N^{th}$ up threshold VH_N based on the mode signal MC. For better explaining the various embodiments of the control signal generator 30, an operation cycle of the control signal generator 30 may be defined in an embodiment as to be equal to one switching cycle of the resonant converter, while in alternative embodiments, as to be equal to a plurality of the switching cycles of the resonant converter. The control signal generator 30 may further be configured to compare the setting voltage signal VCT with the low threshold VL in each operation cycle of the resonant converter, and meanwhile to compare the setting voltage signal VCT with each of the N up thresholds (VH_1, VH_2, ..., VH_N) sequentially operation cycle by operation cycle so as to generate the high-side control signal VG1 and the low-side control signal VG2 at its first and second output terminals. For instance, in a first operation cycle, the setting voltage signal VCT may respectively be compared with the first up threshold VH_1 and the low threshold VL; in a second operation cycle, the setting voltage signal VCT may respectively be compared with the second up threshold VH_2 and the low threshold VL, and so forth. In an embodiment, the control signal generator may comprise an up threshold generator 31, a first comparing circuit 22, a second comparing circuit 23 and a logic circuit 24.

The up threshold generator 31 may comprise an input terminal configured to receive the mode signal MC, and N output terminals. The up threshold generator 31 may be configured to correspondingly generate the N up thresholds (VH_1, VH_2, . . . , VH_N) at the N output terminals, and further configured to select one of the N output terminals to be activated during each operation cycle, i.e., only one of the N up thresholds (VH_1, VH_2, . . . , VH_N) may be provided by the up threshold generator 31 during each switching cycle of the resonant converter. In an embodiment, when the resonant converter operates in the inductive mode, the up threshold generator 31 may be configured to only provide the $N^{th}$ up threshold VH_N during the whole inductive mode period. In another embodiment, when the resonant converter operates in the capacitive mode, the up threshold generator 31 may be configured to provide the N up thresholds (VH_1, VH_2, . . . , VH_N) operation cycle by operation cycle, wherein each of the N up thresholds (VH_1, VH_2, . . . , VH_N) is higher than the low threshold VL. The N up thresholds (VH_1, VH_2, . . . , VH_N) may be provided operation cycle by operation cycle by the up threshold generator 31. In an embodiment, the N up thresholds (VH_1, VH_2, . . . , VH_N−1, VH) may be increased cycle by cycle, e.g., the first up threshold VH_1 is lower than the second up threshold VH_2, the second up threshold VH_2 is lower than the third low threshold VH_3, and the $N^{th}$ up threshold VH_N is the largest one. The switching frequency of the resonant converter can be varied by changing the N up thresholds (VH_1, VH_2, . . . , VH_N).

The first comparing circuit 22 may have a first input terminal configured to receive the low threshold VL, a second input terminal configured to receive the setting voltage signal VCT, and an output terminal. The first comparing circuit 22 may be configured to compare the setting voltage signal VCT with the low threshold VL to provide a first comparing signal CA1. In an embodiment, the first comparing circuit 22 may comprise a comparator, the non-inverting (+) input terminal of the comparator may be operated as the first input terminal of the first comparing circuit 22, and the inverting (−) input terminal of the comparator may be operated as the second input terminal of the first comparing circuit 22.

The second comparing circuit 23 may have a first input terminal configured to receive the setting voltage signal VCT, a second input terminal configured to receive the N up thresholds (VH_1, VH_2, . . . , VH_N) operation cycle by operation cycle, and an output terminal. The second comparing circuit 23 may be configured to compare the setting voltage signal VCT with each of the N up thresholds (VH_1, VH_2, . . . , VH_N) sequentially operation cycle by operation cycle so as to provide a second comparing signal CA2. In an embodiment, the second comparing circuit 23 may comprise a comparator, the non-inverting (+) input terminal of the comparator may be operated as the first input terminal of the second comparing circuit 23, and the inverting (−) input terminal of the comparator may be operated as the second input terminal of the second comparing circuit 23.

The logic circuit 24 may have a first input terminal configured to receive the first comparing signal CA1, a second input terminal configured to receive the second comparing signal CA2, and an output terminal. The logic circuit 24 may be configured to conduct a logic operation of the first comparing signal CA1 and the second comparing signal CA2 to provide the high-side control signal VG1 and the low-side control signal VG2. In an embodiment, the logic circuit 24 may comprise a RS flip-flop, the set terminal (S) of the RS flip-flop may be operated as the first input terminal of the logic circuit 24, and the reset terminal (R) of the of the RS flip-flop may be operated as the second input terminal of the logic circuit 24.

When the setting voltage VCT is higher than any one of N up thresholds (VH_1, VH_2, . . . , VH_N), the logic state of the high-side control signal VG1 may change from the second logic state to the first logic state, and the logic state of the low-side control signal VG2 may change from the first logic state to the second logic state. When the setting voltage VCT is lower than the low thresholds VL, the logic state of the high-side control signal VG1 may change from the first logic state to the second logic state, and the logic state of the low-side control signal VG2 may change from the second logic state to the first logic state.

Furthermore, in the exemplary embodiment of FIG. 7, a control terminal of the first mirror current source 13 may be coupled to the output terminal of the first comparing circuit 22 to receive the first comparing signal CA1 for controlling the charging of the setting capacitor CT. A control terminal of the second mirror current source 14 may be coupled to the output terminal of the second comparing circuit 23 to receive the second comparing signal CA2 for controlling the discharging of the setting capacitor CT. In another embodiment, the first comparing circuit 22 and the second comparing circuit 23 may be replaced with a hysteresis comparator.

Figure 8:
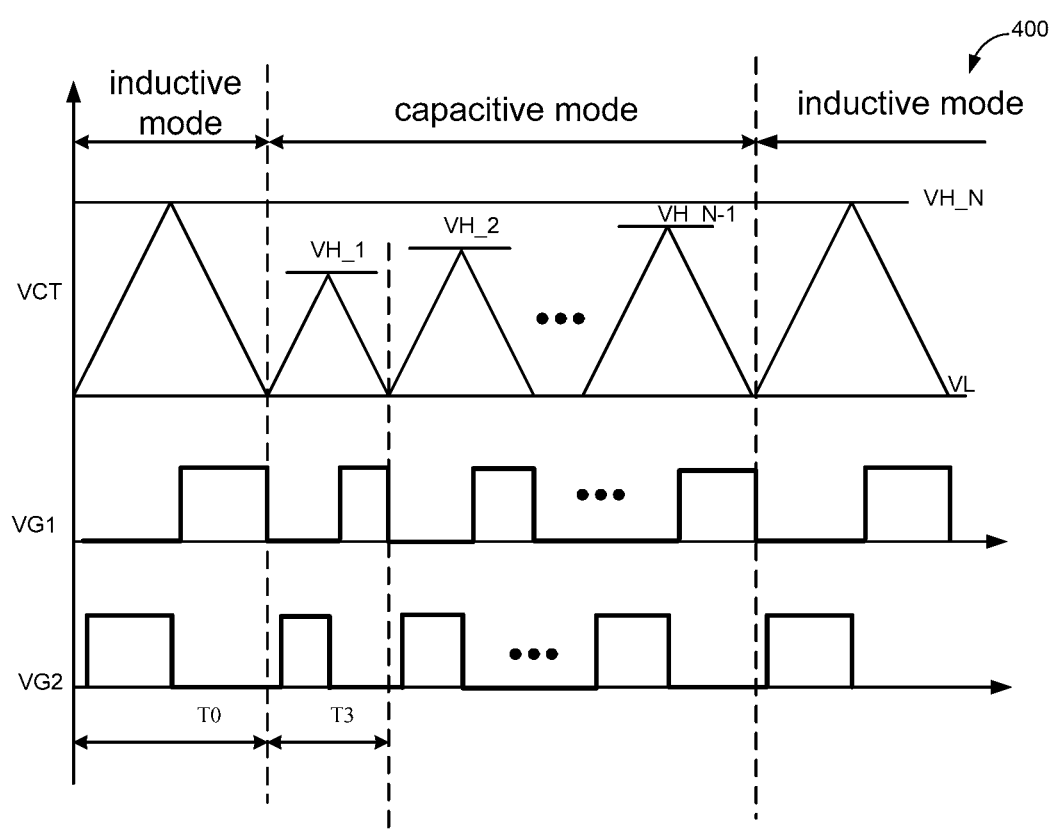
FIG. 8 illustrates an operation waveform diagram 400 of a LLC resonant converter controlled by the frequency controller 300 of FIG. 7 in accordance with an embodiment of the present invention.

FIG. 8 illustrates an operation waveform diagram 400 of a LLC resonant converter controlled by the frequency controller 300 of FIG. 7 in accordance with an embodiment of the present invention. As shown in FIG. 8, the up threshold generator 31 may be configured to generate the N up thresholds (VH_1, VH_2, . . . , VH_N). When the resonant converter operates in the inductive mode, the setting voltage signal VCT may be compared with the low threshold VL, and be compared with the $N^{th}$ up threshold VH_N respectively to provide the high-side control signal VG1 and the low-side control signal VG2. When the resonant converter operates in the capacitive mode, the setting voltage signal VCT may be compared with each of the N up thresholds (VH_1, VH_2, . . . , VH_N) sequentially operation cycle by operation cycle, and be compared with the low threshold VL so as to provide the high-side control signal VG1 and the low-side control signal VG2. As shown in FIG. 8, both of the frequency of the high-side control signal VG1 and the frequency of the low-side control signal VG2 may be increased observably, and the switching cycle of the resonant converter may be decreased from T0 to T3 (T0→T3). Thus, the resonant converter can have a quick dynamic response for exiting the capacitive mode. Furthermore, it should be noted that the waveform diagram 400 may be illustrated for an embodiment of the operation of the frequency controller 300 of FIG. 7, wherein the frequency setter 10 may operate without the soft-start resistor 16, the soft-start capacitor 17 and the soft-start switch 18. If the frequency controller 300 operates with the soft-start resistor 16, the soft-start capacitor 17 and the soft-start switch 18 in the capacitive mode, the soft-start capacitor 17 will be discharged by the soft-start switch 18 when the resonant converter enters into the capacitive mode. Accordingly, both of the frequency of the high-side control signal VG1 and the frequency of the low-side control signal VG2 may become higher than that without the discharging of the soft-start capacitor 17 in the capacitive mode. Thus, a quick dynamic response of the resonant converter in the capacitive mode may be obtained. In an embodiment, the dynamic response of the resonant converter can be changed by varying the first up threshold VH_1. Generally, the smaller the first up threshold VH_1 is, the higher the dynamic response can be. Appropriately choosing the second up threshold VH_2, the third up threshold VH_3, ..., the $N^{th}$ up threshold VH_N can contribute a smoothly transition from the capacitive mode to the indicative mode.

Figure 9:
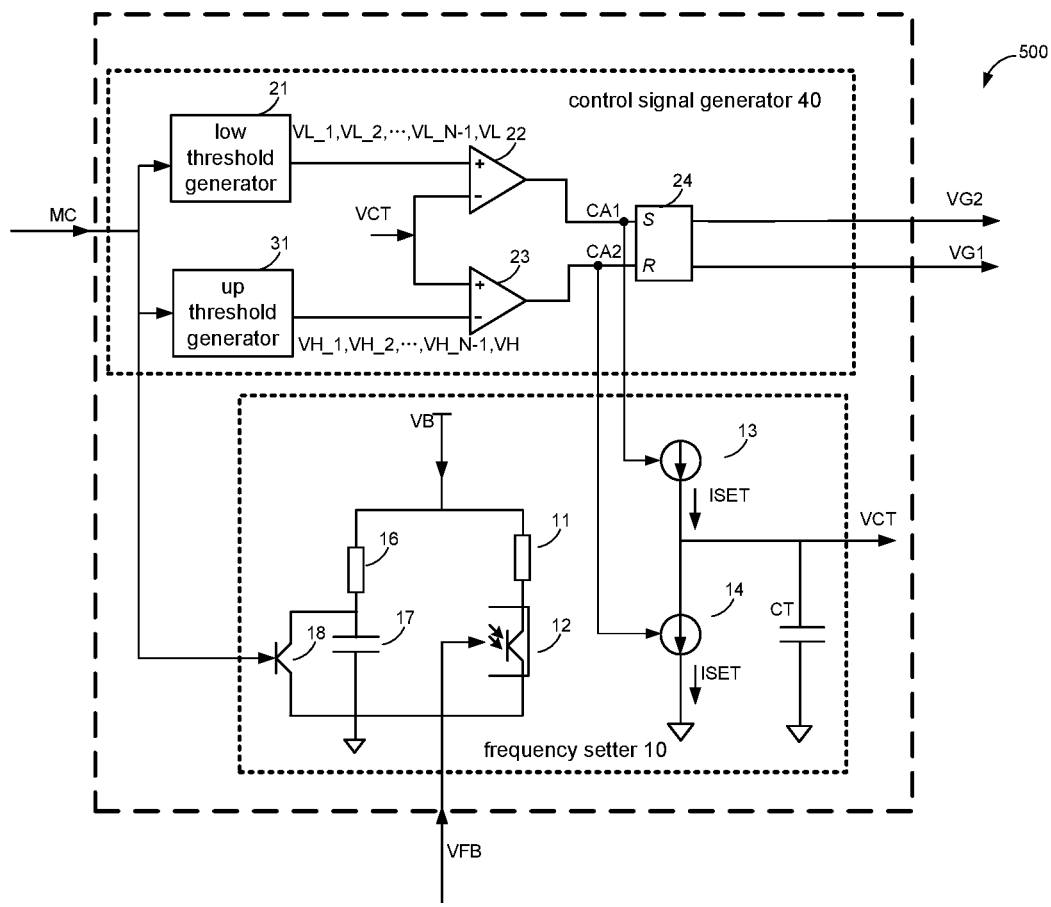
FIG. 9 schematically illustrates a frequency controller 500 in accordance with an embodiment of the present invention.

FIG. 9 schematically illustrates a frequency controller 500 in accordance with an embodiment of the present invention. Compared to the frequency controller 200 of FIG. 5, the frequency controller 500 of FIG. 9 may comprise a control signal generator 40 to replace the control signal generator 20 of FIG. 5.

In the exemplary embodiment of FIG. 9, the control signal generator 40 may comprise a first input terminal configured to receive the mode signal MC, a second input terminal configured to receive the setting voltage signal VCT, a first output terminal and a second output terminal. The control signal generator 40 may be configured to generate the N up thresholds (VH_1, VH_2, ..., VH_N) and the N low thresholds (VL_1, VL_2, ..., VL_N) based on the mode signal MC. For better explaining the various embodiments of the control signal generator 40, an operation cycle of the control signal generator 40 may be defined in an embodiment as to be equal to one switching cycle of the resonant converter, while in alternative embodiments, as to be equal to a plurality of the switching cycles of the resonant converter. The control signal generator 40 may further be configured to compare the setting voltage signal VCT with each of the N up thresholds (VH_1, VH_2, ..., VH_N) sequentially operation cycle by operation cycle, and with each of the N low thresholds (VL_1, VL_2, ..., VL_N) sequentially operation cycle by operation cycle so as to generate the high-side control signal VG1 and the low-side control signal VG2 at its first and second output terminals. For instance, in a first operation cycle, the setting voltage signal VCT may respectively be compared with the first up threshold VH_1 and the first low threshold VL_1; in a second operation cycle, the setting voltage signal VCT may respectively be compared with the second up threshold VH_2 and the second low threshold VL_2, and so forth. In an embodiment, the control signal generator may comprise a low threshold generator 21, an up threshold generator 31, a first comparing circuit 22, a second comparing circuit 23 and a logic circuit 24.

In an embodiment, functions of the low threshold generator 21 and the up threshold generator 31 may be the same as that described above. Thus, they will not be described again.

The first comparing circuit 22 may have a first input terminal configured to receive the N low thresholds (VL_1, VL_2, ..., VL_N) operation cycle by operation cycle, a second input terminal configured to receive the setting voltage signal VCT, and an output terminal. The first comparing circuit 22 may be configured to compare the setting voltage signal VCT with each of the N low thresholds (VL_1, VL_2, ..., VL_N) sequentially operation cycle by operation cycle so as to provide a first comparing signal CA1. In an embodiment, the first comparing circuit 22 may comprise a comparator, the non-inverting (+) input terminal of the comparator may be operated as the first input terminal of the first comparing circuit 22, and the inverting (−) input terminal of the comparator may be operated as the second input terminal of the first comparing circuit 22.

The second comparing circuit 23 may have a first input terminal configured to receive the setting voltage signal VCT, a second input terminal configured to receive the N up thresholds (VH_1, VH_2, ..., VH_N) operation cycle by operation cycle, and an output terminal. The second comparing circuit 23 may be configured to compare the setting voltage signal VCT with each of the N up thresholds (VH_1, VH_2, ..., VH_N) sequentially operation cycle by operation cycle so as to provide a second comparing signal CA2. In an embodiment, the second comparing circuit 23 may comprise a comparator, the non-inverting (+) input terminal of the comparator may be operated as the first input terminal of the second comparing circuit 23, and the inverting (−) input terminal of the comparator may be operated as the second input terminal of the second comparing circuit 23.

The logic circuit 24 may have a first input terminal configured to receive the first comparing signal CA1, a second input terminal configured to receive the second comparing signal CA2, and an output terminal. The logic circuit 24 may be configured to conduct a logic operation to the first comparing signal CA1 and the second comparing signal CA2 to provide the high-side control signal VG1 and the low-side control signal VG2. In an embodiment, the logic circuit 24 may comprise a RS flip-flop, the set terminal (S) of the RS flip-flop may be operated as the first input terminal of the logic circuit 24, and the reset terminal (R) of the of the RS flip-flop may be operated as the second input terminal of the logic circuit 24.

When the setting voltage VCT is higher than any one of N up thresholds (VH_1, VH_2, ..., VH_N), the logic state of the high-side control signal VG1 may change from the second logic state to the first logic state, and the logic state of the low-side control signal VG2 may change from the first logic state to the second logic state. When the setting voltage VCT is lower than any one of N low thresholds (VL_1, VL_2, ..., VL_N), the logic state of the high-side control signal VG1 may change from the first logic state to the second logic state, and the logic state of the low-side control signal VG2 may change from the second logic state to the first logic state.

Furthermore, in the exemplary embodiment of FIG. 9, a control terminal of the first mirror current source 13 may be coupled to the output terminal of the first comparing circuit 22 to receive the first comparing signal CA1 for controlling the charging of the setting capacitor CT. A control terminal of the second mirror current source 14 may be coupled to the output terminal of the second comparing circuit 23 to receive the second comparing signal CA2 for controlling the discharging of the setting capacitor CT. In another embodiment, the first comparing circuit 22 and the second comparing circuit 23 may be replaced with a hysteresis comparator.

Figure 10:
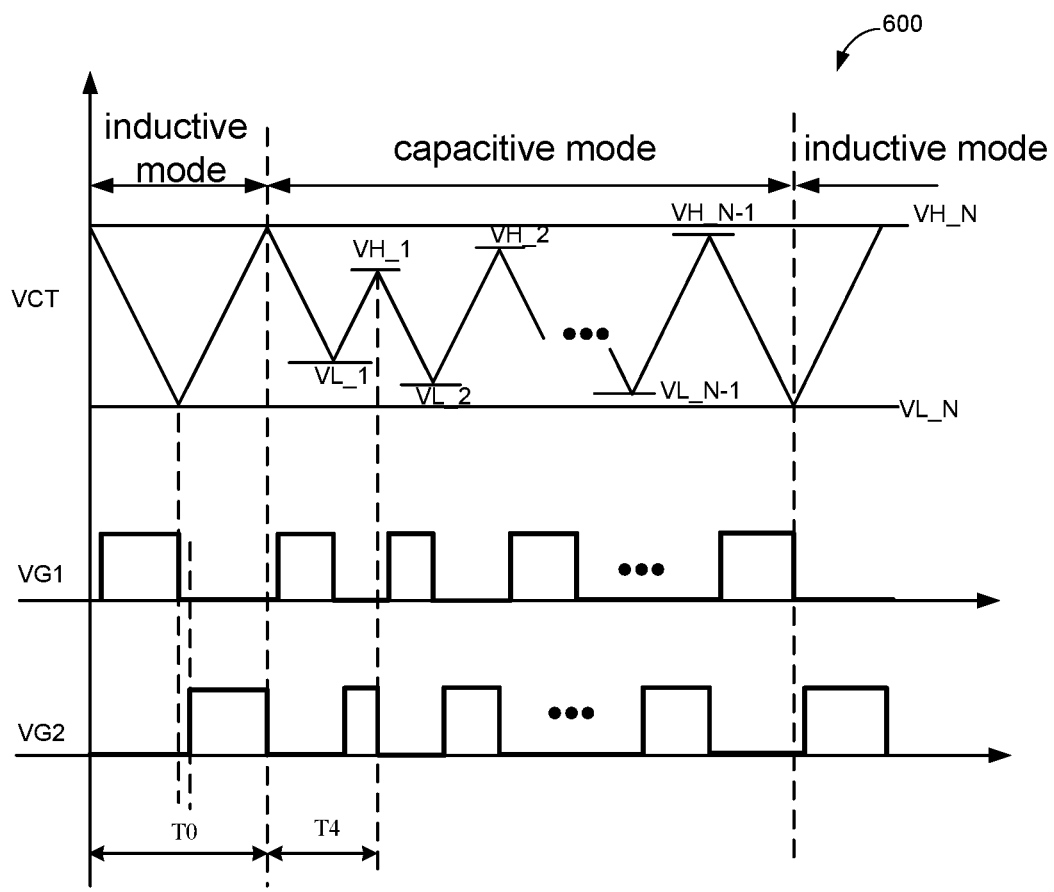
FIG. 10 illustrates an operation waveform diagram 600 of a LLC resonant converter controlled by the frequency controller 500 of FIG. 9 in accordance with an embodiment of the present invention.

FIG. 10 illustrates an operation waveform diagram 600 of a LLC resonant converter controlled by the frequency controller 500 of FIG. 9 in accordance with an embodiment of the present invention. As shown in FIG. 10, the low threshold generator 21 may be configured to generate the N low thresholds (VL_1, VL_2, ..., VL_N), and the up threshold generator 31 may be configured to generate the N up thresholds (VH_1, VH_2, ..., VH_N). When the resonant converter operates in the inductive mode, the setting voltage signal VCT may be compared with the $N^{th}$ low threshold VL_N, and with the $N^{th}$ up threshold VH_N respectively to provide the high-side control signal VG1 and the low-side control signal VG2. When the resonant converter operates in the capacitive mode, the setting voltage signal VCT may be compared with each of the N low thresholds (VL_1, VL_2, ..., VL_N) sequentially operation cycle by operation cycle, and be compared with each of the N up thresholds (VH_1, VH_2, ..., VH_N) sequentially operation cycle by operation cycle so as to provide the high-side control signal VG1 and the low-side control signal VG2. As shown in FIG. 10, both of the frequency of the high-side control signal VG1 and the frequency of the low-side control signal VG2 may be increased observably, and the switching cycle of the resonant converter may be decreased from T0 to T4 (T0→T4). Thus, the resonant converter can have a quick dynamic response for exiting the capacitive mode. Furthermore, it should be noted that the waveform diagram 600 may be illustrated for an embodiment of the operation of the frequency controller 500 of FIG. 9, wherein the frequency setter 10 may operate without the soft-start resistor 16, the soft-start capacitor 17 and the soft-start switch 18. If the frequency controller 500 operates with the soft-start resistor 16, the soft-start capacitor 17 and the soft-start switch 18 at the capacitive mode, the soft-start capacitor 17 will be discharged by the soft-start switch 18 when the resonant converter enters into the capacitive mode. Accordingly, both of the frequency of the high-side control signal VG1 and the frequency of the low-side control signal VG2 may become higher than that without the discharging of the soft-start capacitor 17 at the capacitive mode resulting in a more quick dynamic response of the resonant converter at the capacitive mode. In an embodiment, the dynamic response of the resonant converter can be changed by varying the first low threshold VL_1 and the first high threshold VH_1. Generally, the larger the first low threshold VL_1 is the higher the dynamic response can be. And the smaller the first up threshold VH_1 is, the higher the dynamic response can be. Appropriately choosing the second up threshold VH_2, the third up threshold VH_3, . . . , the $N^{th}$ up threshold VH_N, and the second low threshold VL_2, the third low threshold VL_3, . . . , the $N^{th}$ low threshold VL_N can contribute to a smoothly transition from the capacitive mode to the indicative mode.

Figure 11:
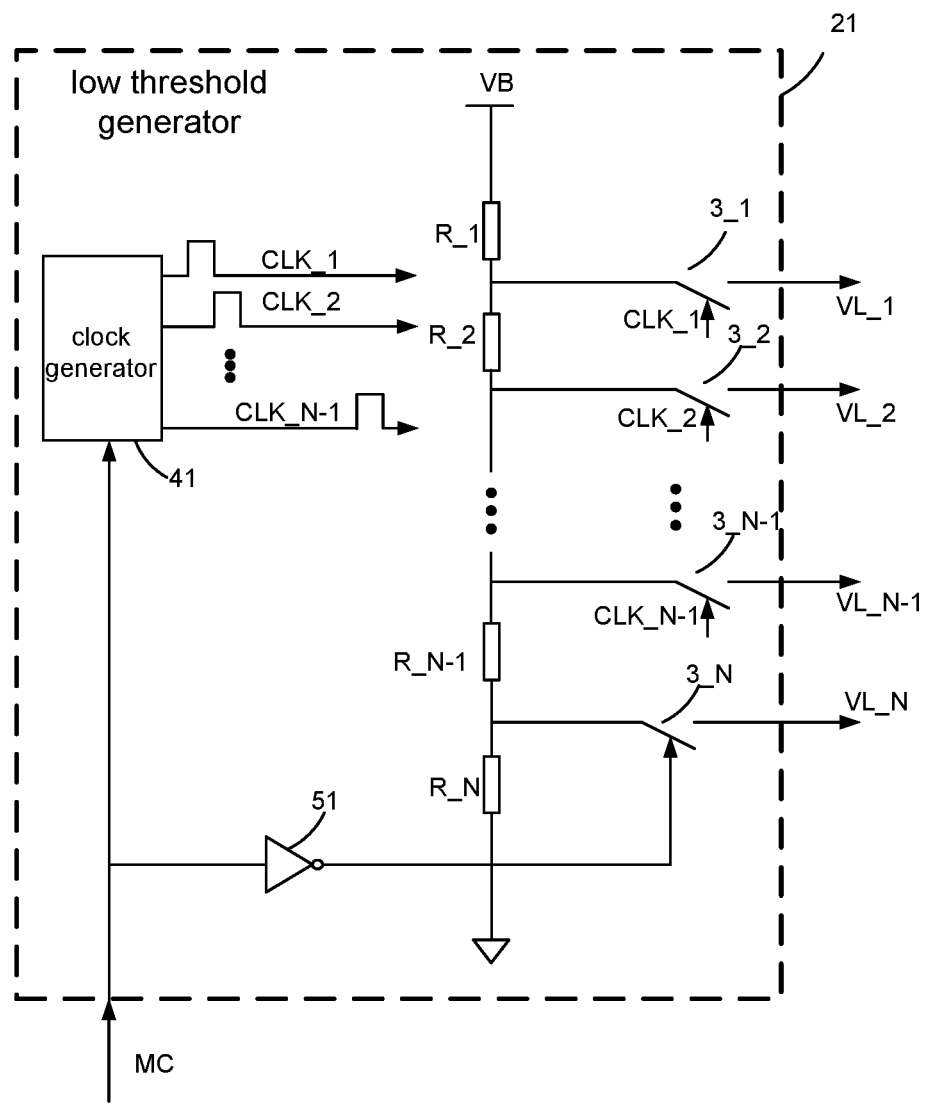
FIG. 11 schematically illustrates the low threshold generator 21 of the frequency controllers 200 and 500 in accordance with an embodiment of the present invention.

FIG. 11 schematically illustrates the low threshold generator 21 of the frequency controllers 200 and 500 in accordance with an embodiment of the present invention. As shown in FIG. 11, the low threshold generator 21 may comprise N resistors (R_1, R_2, . . . , R_N), N controlled switches (3_1, 3_2, . . . , 3_N), a clock generator 41 and an inverter 51. The N resistors may be sequentially connected in series between the supply voltage VB and the logic ground, wherein the resistor R_1 may be connected between the supply voltage VB and the resistor R_2, and the resistor R_N may be connected between the resistor R_N-1 and the logic ground.

The clock generator 41 may have an input terminal configured to receive the mode signal MC, and N-1 output terminals. The clock generator 41 may be configured to generate N-1 clock signals (CLK_1, CLK_2, . . . , CLK_N-1) at the N-1 output terminals once the mode signal MC is in an active state which indicates that the resonant converter enters into the capacitive mode, wherein the N-1 clock signals may be single pulse signals, and each of the N-1 clock signals delays one switching cycle in sequence.

Each of the N controlled switches may have a first terminal, a second terminal and a control terminal. The first terminal of the controlled switch 3_1 may be connected to a common connection of the resistor R_1 and the resistor R_2, the control terminal of the controlled switch 3_1 may be configured to receive the clock signal CLK_1, and the second terminal of the controlled switch 3_1 may be configured to provide the first low threshold VL_1; the first terminal of the controlled switch 3_2 may be connected to a common connection of the resistor R_2 and the resistor R_3, the control terminal of the controlled switch 3_2 may be configured to receive the clock signal CLK_2, and the second terminal of the controlled switch 3_2 may be configured to provide the second low threshold VL_2; . . . ; the first terminal of the controlled switch 3_N-1 may be connected to a common connection of the resistor R_N-2 and the resistor R_N-1, the control terminal of the controlled switch 3_N-1 may be configured to receive the clock signal CLK_N-1, and the second terminal of the controlled switch 3_N may be configured to provide the $(N-1)^{th}$ low threshold VL_N-1. Moreover, the first terminal of the controlled switch 3_N may be connected to a common connection of the resistor R_N-1 and the resistor R_N, the control terminal of the controlled switch 3_N may be configured to receive the mode signal MC through the inverter 51, and the second terminal of the controlled switch 3_N may be configured to provide the $N^{th}$ low threshold VL_N.

When the mode signal MC is in the active state, the N-1 controlled switch may be turned on in sequentially while the control switch 3_N keeps off. When the mode signal MC is in an inactive state which indicates that the resonant converter operates in the inductive mode, the control switch 3_N may be turned on while the N-1 controlled switch may be turned off. In the exemplary embodiment of the FIG. 11, the $N^{th}$ low threshold VL_N may be the smallest one while the $1^{st}$ low threshold VL_1 may be the largest one among the N low thresholds (VL_1, VL_2, . . . , VL_N).

Figure 12:
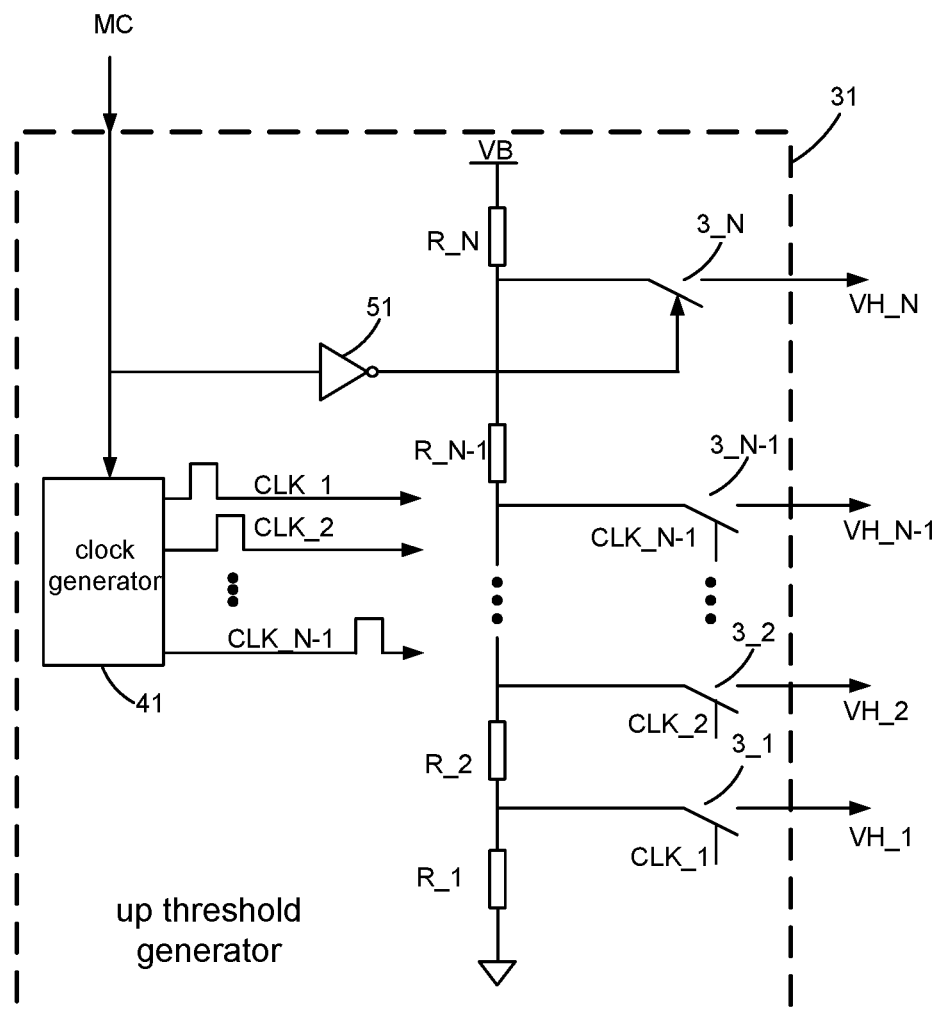
FIG. 12 schematically illustrates the up threshold generator 31 of the frequency controllers 300 and 500 in accordance with an embodiment of the present invention.

FIG. 12 schematically illustrates the up threshold generator 31 of the frequency controllers 300 and 500 in accordance with an embodiment of the present invention. As shown in FIG. 12, the up threshold generator 31 may comprise N resistors (R_1, R_2, . . . , R_N), N controlled switches (3_1, 3_2, . . . , 3_N), a clock generator 41 and an inverter 51. The N resistors may be sequentially connected in series between the supply voltage VB and the logic ground, wherein the resistor R_N may be connected between the supply voltage VB and the resistor R_N-1, and the resistor R_1 may be connected between the resistor R_2 and the logic ground.

The clock generator 41 may have an input terminal configured to receive the mode signal MC, and N-1 output terminals. The clock generator 41 may be configured to generate N-1 clock signals (CLK_1, CLK_2, . . . , CLK_N-1) at the N-1 output terminals once the mode signal MC is in the active state which indicates that the resonant converter enters into the capacitive mode, wherein the N-1 clock signals may be single pulse signals, and each of the N-1 clock signals delays one switching cycle in sequence.

Each of the N controlled switches may have a first terminal, a second terminal and a control terminal. The first terminal of the controlled switch 3_1 may be connected to a common connection of the resistor R_1 and the resistor R_2, the control terminal of the controlled switch 3_1 may be configured to receive the clock signal CLK_1, and the second terminal of the controlled switch 3_1 may be configured to provide the first up threshold VH_1; the first terminal of the controlled switch 3_2 may be connected to a common connection of the resistor R_2 and the resistor R_3, the control terminal of the controlled switch 3_2 may be configured to receive the clock signal CLK2, and the second terminal of the controlled switch 3_2 may be configured to provide the second up threshold VH_2; . . . ; the first terminal of the controlled switch 3_N-1 may be connected to a common connection of the resistor R_N-2 and the resistor R_N-1, the control terminal of the controlled switch 3_N-1 may be configured to receive the clock signal CLK_N-1, and the second terminal of the controlled switch 3_N may be configured to provide the $(N-1)^{th}$ up threshold VH_N-1. Moreover, the first terminal of the controlled switch 3_N may be connected to a common connection of the resistor R_N-1 and the resistor R_N, the control terminal of the controlled switch 3_N may be configured to receive the mode signal MC through the inverter 51, and the second terminal of the controlled switch 3_N may be configured to provide the $N^{th}$ up threshold VH_N.

When the mode signal MC indicates that the resonant converter enters into the capacitive mode, the N-1 controlled switches may be turned on sequentially while the control switch 3_N keeps off. When the mode signal MC indicates that the resonant converter operates in the inductive mode, the control switch 3_N may be turned on while the N-1 controlled switch may be turned off. In the exemplary embodiment of the FIG. 12, the $N^{th}$ threshold VH_N may be the largest one while the first up threshold VH_1 may be the smallest one among the N up thresholds (VH_1, VH_2, VH_N).

In other embodiments, other suitable circuits can be adopted to generate the N low thresholds and the N up thresholds. For example, in an embodiment, we can use a plurality of mirror current sources and resistors to generate the low thresholds and the up thresholds.

Figure 13:
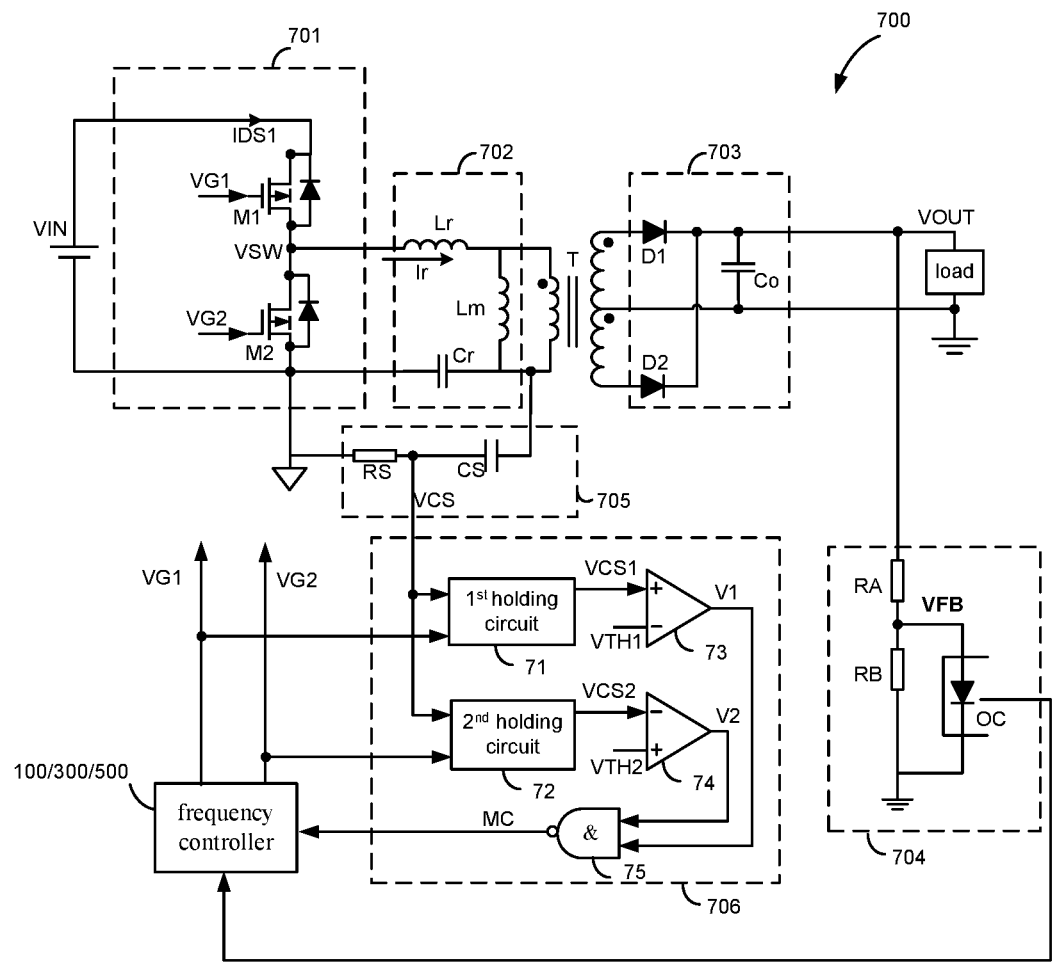
FIG. 13 illustrates a half-bridge LLC resonant converter 700.

FIG. 13 illustrates a half-bridge LLC resonant converter 700. As shown in FIG. 13, the resonant converter 700 may comprise a square-wave generator 701, a resonant network 702, an isolated transformer T and a rectifier network 703.

The square-wave generator 701 is illustrated as a half-bridge topology comprising a high-side switch M1 and a low-side switch M2, wherein the high-side switch M1 and a low-side switch M2 may be connected in series between a positive terminal and a negative terminal of a DC power supply VIN. The high-side switch M1 may be controlled by a high-side control signal VG1, and the low-side switch M2 may be controlled by a low-side control signal VG2 which has the same duty cycle as the high-side control signal VG1. Ideally, this duty cycle may be regulated at a constant value 0.5. The square-wave generator 701 may be configured to convert the DC power supply VIN to a square wave signal VSW by controlling the high-side switch M1 and the low-side switch M2 to switch on and off in a complementary manner. As can be appreciated, though in the exemplary embodiment of FIG. 13, the square-wave generator 701 is illustrated as a half-bridge topology, in other embodiment, it can be illustrated as other suitable topologies, e.g., full bridge topology and so on.

The resonant network 702 may comprise a series-parallel resonant network having a first inductor Lr, a second inductor Lm and a resonant capacitor Cr, wherein the second inductor Lm may be connected in parallel to a primary winding of the isolated transformer T. In an embodiment, the second inductor Lm may comprise a field winding of the isolated transformer T. The resonant network 702 may be configured to receive the square wave signal VSW and to convert the square wave signal VSW to an AC (Alternating Current) voltage signal.

The isolated transformer T may comprise the primary winding and a secondary winding having a first terminal, a second terminal and a third terminal. The secondary winding has a first secondary winding and a second secondary winding connected in series. A dotted terminal of the first secondary winding may be operated as the first terminal of the secondary winding, a non-dotted terminal of the second secondary winding may be operated as the second terminal of the secondary winding, and a non-dotted terminal of the first secondary winding may be connected to a dotted terminal of the second secondary winding and be operated as the third terminal of the secondary winding.

The rectifier network 703 may be coupled between the second winding of the isolated transformer T and a load. The rectifier network 703 may comprise a first diode D1, a second diode D2 and an output capacitor Co. An anode of the first diode D1 may be coupled to the first terminal of the secondary winding, an anode of the second diode D2 may be coupled to the second terminal of the secondary winding, the cathode of the first diode D1 and the cathode of the second diode D2 may be coupled together to a first terminal of the output capacitor Co, and the second terminal of the output capacitor Co may be coupled with the third terminal of the secondary winding to connect to a logic ground.

The rectifier network 703 may be configured to receive the AC voltage signal and to convert the AC voltage signal to an output voltage signal VOUT.

The half-bridge LLC resonant converter 700 may further comprise a control circuit. The control circuit may comprise a voltage sensing circuit 704, a current sensing circuit 705, a mode judging circuit 706 and a frequency controller. It can be appreciated, the frequency controller may adopt any one embodiment of the frequency controllers 100, 300 and 500.

The voltage sensing circuit 704 may be configured to sense the output voltage signal VOUT to generate a feedback voltage signal VFB which is indicative of the output voltage signal VOUT. In the exemplary embodiment of the FIG. 13, the voltage sensing circuit 704 may comprise a resistor RA, a resistor RB and an Optic-Coupler (OC). The resistor RA and the resistor RB may be connected in serial between an output terminal of the resonant converter 700 and the logic ground. The OC may be coupled to a common connection of the resistor RA and the resistor RB to receive the feedback voltage signal VFB, and configured to provide the feedback voltage signal VFB to the frequency controller 100, 300, or 500. In this embodiment, The OC may be operated as the variable resistor 12 of the frequency controllers 100, 300, or 500, wherein variation of the resistance of the OC may be controlled by the feedback voltage signal VFB. Besides, the OC may further have a function of insulation a secondary circuit from a primary circuit of the transformer T. The feedback voltage signal VFB may comprise multiple signal forms, e.g., current signal, voltage signal and the like.

The current sensing circuit 705 may be configured to sense a current signal Ir flowing through the first inductor Lr to generate a current sense signal VCS which is indicative of the current signal Ir. In the exemplary embodiment of the FIG. 13, the current sensing circuit 705 may comprise a sense resistor RS and a sense capacitor CS. a first terminal of the sense resistor RS may be connected to a first terminal of the sense capacitor CS, a second terminal of the sense resistor RS may be connected to the logic ground, and a second terminal of the sense capacitor CS may be connected to a common connection of the resonant capacitor Cr and a non-dotted terminal of the primary winding of the isolated transformer T. The common connection of the sense resistor RS and the sense capacitor CS may be served as an output terminal of the current sensing circuit 705 to provide the current sense signal VCS.

The mode judging circuit 706 may be configured to receive the current sense signal VCS, the high-side control signal VG1 and the low-side control signal VG2, and to generate a mode signal MC based on the current sense signal VCS, the high-side control signal VG1 and the low-side control signal VG2, wherein the mode signal MC may be configured to judge whether the half-bridge LLC resonant converter 700 operates in an inductive mode or a capacitive mode. In an embodiment, at the moment when the low-side switch M2 is turned off, the mode judging circuit 706 may be configured to judge whether the current sense signal VCS is negative, i.e., the current signal Ir is negative. If the current sense signal VCS is negative, the half-bridge LLC resonant converter 700 may operate in the inductive mode. Reversely, if the current sense signal VCS is positive, the half-bridge LLC resonant converter 700 may operate in the capacitive mode. In another embodiment, at the moment when the high-side switch M1 is turned off, the mode judging circuit 706 may be configured to judge whether the current sense signal VCS is positive. If the current sense signal VCS is positive, the half-bridge LLC resonant converter 700 may operate in the inductive mode. Reversely, if the current sense signal VCS is negative, the half-bridge LLC resonant converter 700 may operate in the capacitive mode.

In an embodiment, the mode judging circuit 706 may comprise a first holding circuit 71, a second holding circuit 72, a first zero-crossing comparator 73, a second zero-crossing comparator 74 and a logic circuit 75. The first holding circuit 71 may be configured to receive the current sense signal VCS and the high-side control signal VG1, and further configured to latch a magnitude of the current sense signal VCS at the falling edge of the high-side control signal VG1 so as to output a first current sense signal VCS1. The second holding circuit 72 may be configured to receive the current sense signal VCS and the low-side control signal VG2, and further configured to latch a magnitude of the current sense signal VCS at the falling edge of the low-side control signal VG2 so as to output a second current sense signal VCS2. The first zero-crossing comparator 73 may be configured to receive the first current sense signal VCS1, and further configured to compare the first current sense signal VCS1 with a first zero-crossing threshold VTH1 to output a first mode signal V1, wherein the first mode signal V1 may be in an active state (e.g. logic low) when the first current sense signal VCS1 is lower than the first zero-crossing threshold VTH1. The second zero-crossing comparator 74 may be configured to receive the second current sense signal VCS2, and further configured to compare the second current sense signal VCS1 with a second zero-crossing threshold VTH2 to output a second mode signal V2, wherein the second mode signal V2 may be in an active state (e.g. logic low) when the second current sense signal VCS2 is higher than the second zero-crossing threshold VTH2. The logic circuit 75 may be configured to receive the first mode signal V1 and the second mode signal V2, and further configured to conduct a logic operation to the first mode signal V1 and the second mode signal V2 to generate the mode signal MC, wherein either the first mode signal V1 or the second mode signal V2 is in the active state, the mode signal MC may be in its active state which may be indicative of a capacitive mode that the resonant converter 700 enters into. In an embodiment, the first zero-crossing threshold VTH1 may be slightly smaller than zero, e.g., −80 mV, and the second zero-crossing threshold VTH2 may be slightly larger than zero, e.g., 80 mV. For this situation, if the current sense signal VCS is lower than −80 mV at the moment when the low-side switch M2 is turned off, the half-bridge LLC resonant converter 700 may operate in the inductive mode, and reversely, if the current sense signal VCS is higher than 80 mV at the moment when the low-side switch M2 is turned off, the half-bridge LLC resonant converter 700 may operates in the capacitive mode. In another embodiment, if the current sense signal VCS is lower than −80 mV at the moment when the high-side switch M1 is turned off, the half-bridge LLC resonant converter 700 may operate in the capacitive mode, and reversely, if the current sense signal VCS is higher than 80 mV at the moment when the high-side switch M1 is turned off, the half-bridge LLC resonant converter 700 may operate in the inductive mode.

Figure 14:
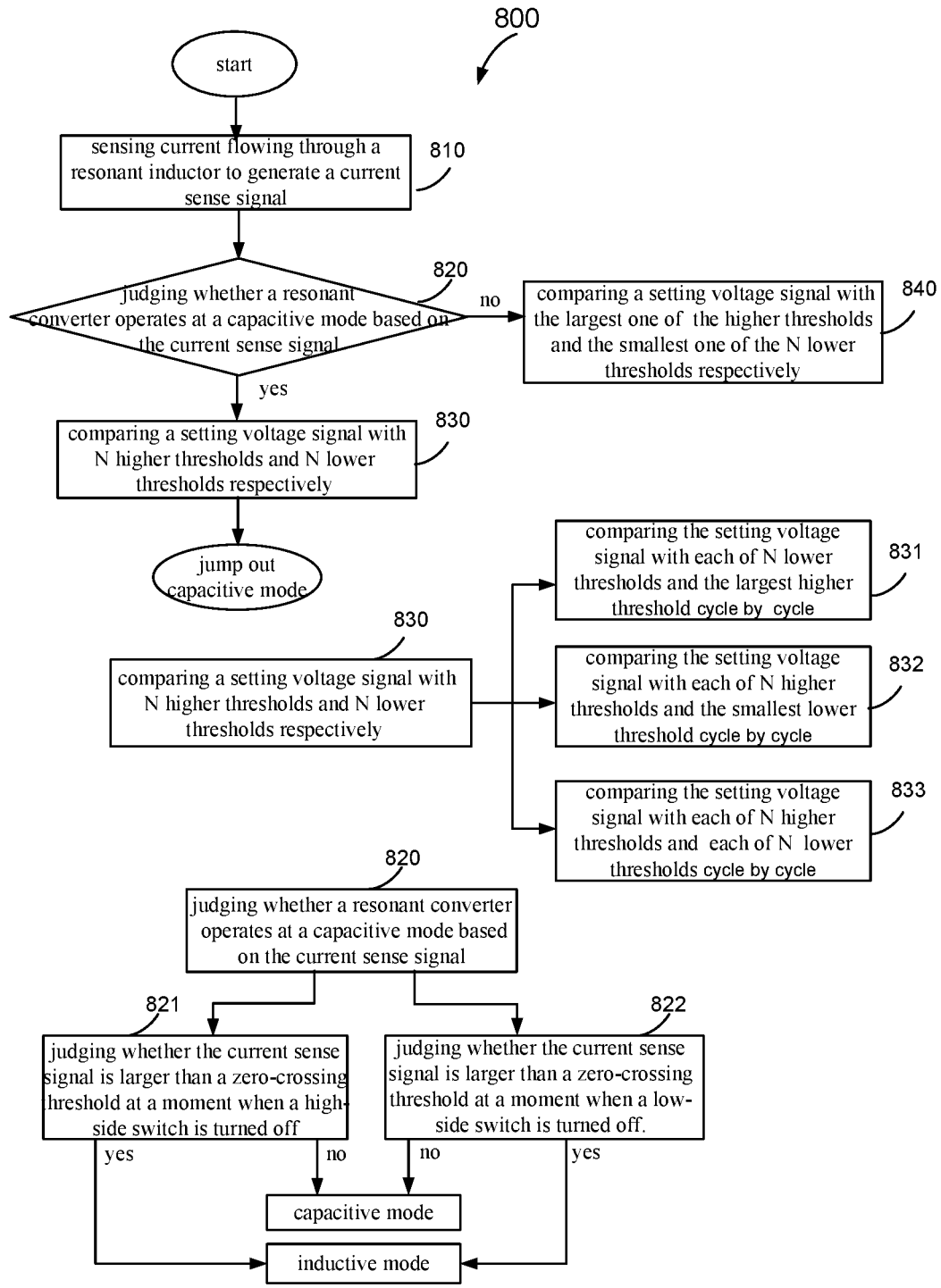
FIG. 14 illustrates a control method 800 for a resonant converter in accordance with an embodiment of the present invention.

FIG. 14 illustrates a control method 800 for a resonant converter in accordance with an embodiment of the present invention. The resonant converter may comprise a square-wave generator having a high-side switch M1 and a low-side switch M2. The square-wave generator may be configured to convert the DC power supply VIN to a square-wave signal VSW by controlling the high-side switch M1 and the low-side switch M2 to switch on and off in a complementarily manner. The resonant converter may further comprise a resonant network 702 at least comprising a resonant inductor Lr and a resonant capacitor Cr. The resonant converter may further comprise a setting capacitor CT configured to change the switching frequency of the resonant converter through charging and discharging the setting capacitor CT. A terminal of the resonant inductor Lr may be connected to a common connection of the high-side switch M1 and the low-side switch M2. As shown in FIG. 14, the control method 800 may comprise steps 810-840.

In step 810, sensing a current Ir flowing through the resonant inductor Lr to generate a current sense signal VCS which is indicative of the current Ir.

In step 820, judging whether the resonant converter operates in a capacitive mode based on the current sense signal VCS. If the resonant converter enters into a capacitive mode, turns to 830, otherwise, turns to 840. Furthermore, in step 820, it may comprise providing N up thresholds (VH_1, VH_2, . . . , VH_N) and N low thresholds (VL_1, VL_2, . . . , VL_N), wherein each of the N up thresholds is corresponding to each of the N low thresholds, and wherein each of the N up thresholds is higher than each of the N low thresholds correspondingly, and wherein N is a positive integer and is larger than or equal to 2.

In step 830, comparing a setting voltage signal VCT across the setting capacitor CT with each of the N up thresholds operation cycle by operation cycle, and with each of the N low thresholds operation cycle by operation cycle to generate the high-side control signal VG1 and the low-side control signal VG2 for controlling the high-side switch M1 and the low-side switch M2, wherein the operation cycle may comprise one or more switching cycles of the resonant converter. The switching frequency of the resonant converter may be changed by varying the N up thresholds and the N low thresholds.

In step 840, comparing the setting voltage signal VCT with the largest one of N up thresholds (e.g., the $N^{th}$ up threshold VH_N) and with the smallest one of N low thresholds (e.g., the $N^{th}$ low threshold VL_N) respectively in each operation cycle to generate the high-side control signal VG1 and the low-side control signal VG2 for controlling the high-side switch M1 and the low-side switch M2.

In an embodiment, judging whether the resonant converter operates in the capacitive mode of step 820 may comprise step 821. In step 821, judging whether the current signal Ir is higher than the zero-crossing threshold at the moment when the high-side switch M1 is turned off. In an embodiment, the zero-crossing threshold may be a hysteresis signal having a first zero-crossing threshold VTH1 (e.g., 80 mV) and a second zero-crossing threshold VTH2 (e.g., −80 mV). If the current sense signal VCS is lower than −80 mV at the moment when the high-side switch M1 is turned off, the half-bridge LLC resonant converter 700 may operate in the capacitive mode, and reversely, if the current sense signal VCS is higher than 80 mV at the moment when the high-side switch M1 is turned off, the half-bridge LLC resonant converter 700 may operate in the inductive mode.

In an embodiment, judging whether the resonant converter operates in the capacitive mode of step 820 may comprise step 822. In step 822, judging whether the current signal Ir is higher than the zero-crossing threshold at the moment when the low-side switch M2 is turned off. In an embodiment, if the current sense signal VCS is lower than −80 mV at the moment when of the low-side switch M2 is turned off, the half-bridge LLC resonant converter 700 may operate in the inductive mode, and reversely, if the current sense signal VCS is higher than 80 mV at the moment when the low-side switch M2 is turned off, the half-bridge LLC resonant converter 700 may operate in the capacitive mode.

In an embodiment, comparing the setting voltage signal VCT of the setting capacitor CT with each of the N up thresholds operation cycle by operation cycle, and with each of the N low thresholds operation cycle by operation cycle of step 830 may comprise step 831. In step 831, the setting voltage signal VCT may be compared with each of the N low thresholds operation cycle by operation cycle, and be compared with the largest up threshold (e.g., the $N^{th}$ up threshold VH_N) to provide the high-side control signal VG1 and the low-side control signal VG2.

In an embodiment, comparing the setting voltage signal VCT of the setting capacitor CT with each of the N up thresholds operation cycle by operation cycle, and with each of the N low thresholds of step 830 may comprise step 832. In step 832, the setting voltage signal VCT may be compared with each of N up thresholds operation cycle by operation cycle, and with the smallest low threshold (e.g., the $N^{th}$ low threshold VL_N) to provide the high-side control signal VG1 and the low-side control signal VG2.

In an embodiment, comparing the setting voltage signal VCT of the setting capacitor CT with each of the N up thresholds operation cycle by operation cycle, and with each of the N low thresholds of step 830 may comprise step 833. In step 833, the setting voltage signal VCT may be compared with each of N up thresholds operation cycle by operation cycle, and with each of N low thresholds operation cycle by operation cycle to provide the high-side control signal VG1 and the low-side control signal VG2.

Obviously many modifications and variations of the present invention are possible in light of the above teachings. It is therefore to be understood that within the scope of the appended claims the invention may be practiced otherwise than as specifically described. It should be understood, of course, the foregoing invention relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What we claim is:

1. A control method used for controlling a resonant converter, wherein the resonant converter comprises a setting capacitor used for regulating a switching frequency of the resonant converter, the control method comprising:

sensing a current flowing through a resonant inductor of the resonant converter to generate a current sense signal;

judging whether the resonant converter operates in an inductive mode or a capacitive mode based on the current sense signal;

providing N up thresholds and N low thresholds, wherein each of the N up thresholds is corresponding to each of the N low thresholds, and wherein each of the N up thresholds is higher than each of the N low thresholds correspondingly, and wherein N is a positive integer and is larger than or equal to 2;

when the resonant converter operates in the inductive mode, comparing a setting voltage signal across the setting capacitor with the largest one of the N up thresholds, and with the smallest one of the N low thresholds in each operation cycle to generate a high-side control signal and a low-side control signal respectively used for controlling a high-side switch and a low-side switch of the resonant converter, wherein the operation cycle comprises one or more switching cycles of the resonant converter;

when the resonant converter operates in the capacitive mode, comparing the setting voltage signal with each of the N up thresholds sequentially operation cycle by operation cycle, and with each of the N low thresholds sequentially operation cycle by operation cycle to generate the high-side control signal and the low-side control signal; and changing the switching frequency of the resonant converter by varying the N up thresholds and the N low thresholds.

2. The control method of claim 1, wherein the N up thresholds are identical, and wherein the N low thresholds are decreased operation cycle by operation cycle.

3. The control method of claim 1, wherein the N low thresholds are identical, and wherein the N up thresholds are increased operation cycle by operation cycle.

4. The control method of claim 1, wherein the N low thresholds are decreased operation cycle by operation cycle, and wherein the N up thresholds are increased operation cycle by operation cycle.

5. The control method of claim 1, wherein both the high-side control signal and the low-side control signal have a first logic state and a second logic state, and wherein when the setting voltage signal is higher than one of the N up thresholds, the high-side control signal changes from the second logic state to the first logic state, and the low-side control signal changes from the first logic state to the second logic state; and wherein when the setting voltage signal is lower than one of the N low thresholds, the high-side control signal changes from the first logic state to the second logic state, and the second logic state of the low-side control signal changes from the second logic state to the first logic state.

6. The control method of claim 1, wherein judging whether the resonant converter operates in the inductive mode or the capacitive mode comprises:

at the moment when the high-side switch is turned off, judging whether the current sense signal is higher than a zero-crossing threshold, wherein if the current sense signal is higher than the zero-crossing threshold, the resonant converter operates in the inductive mode, and wherein if the current signal is lower than the zero-crossing threshold, the resonant converter operates in the capacitive mode; and at the moment when the low-side switch is turned off, judging whether the current sense signal is higher than a zero-crossing threshold, wherein if the current signal is higher than the zero-crossing threshold, the resonant converter operates in the capacitive mode, and wherein if the current signal is lower than the zero-crossing threshold, the resonant converter operates in the inductive mode.

7. The control method of claim 6, wherein the zero-crossing threshold comprise a hysteresis signal having a first zero-crossing threshold and a second zero-crossing threshold, and wherein the first zero-crossing threshold is smaller than zero, and the second zero-crossing threshold is larger than zero, and wherein
at the moment when the high-side switch is turned off, if the current signal is higher than the first zero-crossing threshold, the resonant converter operates in the inductive mode, and if the current signal is lower than the second zero-crossing threshold, the resonant converter operates in the conductive mode; and wherein
at the moment when the low-side switch is turned off, if the current signal is higher than the first zero-crossing threshold, the resonant converter operates in the conductive mode, and if the current signal is lower than the second zero-crossing threshold, the resonant converter operates in the inductive mode.

8. A control circuit used for controlling a resonant converter, comprising:
a voltage sensing circuit, configured to sense an output voltage signal of the resonant converter to generate a feedback voltage signal;
a current sensing circuit, configured to sense a current flowing through a resonant inductor of the resonant converter to generate a current sense signal;
a mode judging circuit, configured to receive the current sense signal, and further configured to compare the current sense signal with a zero-crossing threshold to generate a mode signal, wherein the mode signal is configured to judge whether the resonant converter operates in an inductive mode or a capacitive mode; and
a frequency controller, configured to receive the mode signal and the feedback voltage signal, and further configured to generate a high-side control signal and a low-side control signal respectively used for controlling a high-side switch and a low-side switch of the resonant converter based on the feedback voltage signal and the mode signal, wherein the frequency controller comprises a setting capacitor, and wherein the frequency controller further comprises N up thresholds and N low thresholds, and wherein each of the N up thresholds is corresponding to each of the N low thresholds, and wherein each of the N up thresholds is higher than each of the N low thresholds correspondingly, and wherein N is a positive integer and is larger than or equal to 2, and wherein
when the resonant converter operates in the inductive mode, the frequency controller is configured to compare a setting voltage signal across the setting capacitor with the largest one of the N up thresholds, and with the smallest one of the N low thresholds in each operation cycle to generate the high-side control signal and the low-side control signal, wherein the operation cycle comprises one or more switching cycles of the resonant converter, and wherein
when the resonant converter enters into the capacitive mode, the frequency controller is configured to compare the setting voltage signal with each of the N up thresholds sequentially operation cycle by operation cycle, and with each of the N low thresholds sequentially operation cycle by operation cycle to generate the high-side control signal and the low-side control signal, and wherein
the frequency controller is further configured to change a switching frequency of the resonant converter by varying the N up thresholds and the N low thresholds.

9. The control circuit of claim 8, wherein the N up thresholds are identical, and wherein the N low thresholds are decreased operation cycle by operation cycle.

10. The control circuit of claim 8, wherein the N low thresholds are identical, and wherein the N up thresholds are increased operation cycle by operation cycle.

11. The control circuit of claim 8, wherein the N low thresholds are increased operation cycle by operation cycle, and wherein the N up thresholds are increased operation cycle by operation cycle.

12. The control circuit of claim 8, wherein both the high-side control signal and the low-side control signal have a first logic state and a second logic state, and wherein
when the setting voltage signal is higher than one of the N up thresholds, the high-side control signal changes from the second logic state to the first logic state, and the low-side control signal changes from the first logic state to the second logic state; and wherein
when the setting voltage signal is lower than one of the N low thresholds, the high-side control signal changes from the first logic state to the second logic state, and the second logic state of the low-side control signal changes from the second logic state to the first logic state.

13. The control circuit of claim 8, wherein the frequency controller comprises:
a frequency setter, configured to generate a charging current and a discharging current based on the feedback voltage signal, wherein when the setting voltage signal is lower than one of the N low thresholds, the setting capacitor is charged by the charging current, and wherein when the setting voltage is higher than one of the N up thresholds, the setting capacitor is discharged by the discharging current, and wherein a charging rate of the setting capacitor is equal to a discharging rate of the setting capacitor; and
a control signal generator, configured to receive the mode signal to generate the N low thresholds and the N up thresholds, and further configured to receive the setting voltage signal, wherein
when the resonant converter operates in the inductive mode, the control signal generator is configured to compare the setting voltage signal with the largest one of N up thresholds, and with the smallest one of N low thresholds, and wherein
when the mode signal indicates the resonant converter enters into the capacitive mode, the control signal generator is configured to compare the setting voltage signal with each of the N up thresholds sequentially operation cycle by operation cycle, and with each of the N low thresholds sequentially operation cycle by operation cycle.

14. The control circuit of claim 13, wherein the frequency setter comprises:
a first resistor;
a variable resistor, connected to the first resistor in series between a supply voltage and a logic ground for generating a first current signal, wherein a control terminal of the variable resistor is configured to receive the feedback voltage signal, and wherein the resistance of the variable resistor is varied in accordance with the variation of the feedback voltage signal; and a first mirror current source, configured to mirror the first current signal to generate the charging current;

a second mirror current source, configured to mirror the first current signal to generate the discharging current; and the setting capacitor, connected between a common connection of the first mirror current source and the second mirror current source and the logic ground.

15. The control circuit of claim 14, wherein the control signal generator comprises:

a low threshold generator, having an input terminal and N output terminals, wherein the low threshold generator is configured to receive the mode signal at the input terminal and to generate the N low thresholds respectively at the N output terminals, and wherein the low threshold generator is further configured to select one of the N output terminals to be activated during each operation cycle;

a first comparing circuit having a first input terminal configured to receive the N low thresholds operation cycle by operation cycle, a second input terminal configured to receive the setting voltage signal, and the first comparing circuit is configured to compare the setting voltage signal with one of the N low thresholds operation cycle by operation cycle to provide a first comparing signal;

a second comparing circuit having a first input terminal configured to receive the setting voltage signal, a second input terminal configured to receive the largest one of the N up thresholds, and the second comparing circuit is configured to compare the setting voltage signal with the largest one of the N up thresholds in each switching cycle to provide a second comparing signal; and a logic circuit having a first input terminal configured to receive the first comparing signal, a second input terminal configured to receive the second comparing signal, and the logic circuit is configured to conduct a logic operation to the first comparing signal and the second comparing signal to provide the high-side control signal and the low-side control signal.

16. The control circuit of claim 14, wherein the control signal generator comprises:

an up threshold generator having an input terminal and N output terminals, wherein the up threshold generator is configured to receive the mode signal at the input terminal and to generate the N up thresholds respectively at the N output terminals, and wherein the up threshold generator is further configured to select one of the N output terminals to be activated during each operation cycle;

a first comparing circuit having a first input terminal configured to receive the smallest one of the N low thresholds, a second input terminal configured to receive the setting voltage signal, and the first comparing circuit is configured to compare the setting voltage signal with the smallest one of the N low thresholds in each switching cycle to provide a first comparing signal;

a second comparing circuit having a first input terminal configured to receive the setting voltage signal, a second input terminal configured to receive the N up thresholds operation cycle by operation cycle, and the second comparing circuit is configured to compare the setting voltage signal with each of the N up thresholds operation cycle by operation cycle to provide a second comparing signal; and a logic circuit having a first input terminal configured to receive the first comparing signal, a second input terminal configured to receive the second comparing signal, and the logic circuit is configured to conduct a logic operation to the first comparing signal and the second comparing signal to provide the high-side control signal and the low-side control signal.

17. The control circuit of claim 14, wherein the control signal generator comprises:

a low threshold generator having an input terminal and N output terminals, wherein the low threshold generator is configured to receive the mode signal at the input terminal and to generate the N low thresholds respectively at the N output terminals, and the low threshold generator is further configured to select one of the N output terminals to be activated during each switching cycle of the resonant converter;

an up threshold generator having an input terminal and N output terminals, wherein the up threshold generator is configured to receive the mode signal at the input terminal and to generate the N up thresholds respectively at the N output terminals, and wherein the up threshold generator is further configured to select one of the N output terminals to be activated during each operation cycle;

a first comparing circuit having a first input terminal configured to receive the N low thresholds operation cycle by operation cycle, a second input terminal configured to receive the setting voltage signal, and the first comparing circuit is configured to compare the setting voltage signal with each of the N low thresholds operation cycle by operation cycle to provide a first comparing signal;

a second comparing circuit having a first input terminal configured to receive the setting voltage signal, a second input terminal configured to receive the N up thresholds operation cycle by operation cycle, and the second comparing circuit is configured to compare the setting voltage signal with each of the N up thresholds operation cycle by operation cycle to provide a second comparing signal; and a logic circuit having a first input terminal configured to receive the first comparing signal, a second input terminal configured to receive the second comparing signal, and the logic circuit is configured to conduct a logic operation to the first comparing signal and the second comparing signal to provide the high-side control signal and the low-side control signal.

18. The control circuit of claim 17, wherein the first comparing signal is further connected to a control terminal of the first mirror current source to control the charging of the setting capacitor, and wherein the second comparing signal is connected to a control terminal of the second mirror current source to control the discharging of the setting capacitor.

19. A resonant converter, comprising:

a square-wave generator having a high-side switch and a low-side switch, configured to convert a power supply to a square-wave signal by controlling the high-side switch and the low-side switch on and off in a complementary manner;

an isolated transformer;

a resonant network including a first resonant inductor, a second resonant inductor and a resonant capacitor, configured to convert the square-wave signal to an alternating current voltage signal;

a rectifier network coupled between a secondary winding of the isolated transformer and a load, and configured to convert the alternating current voltage signal to an output voltage signal; and a control circuit comprising a setting capacitor, N up thresholds and N low thresholds, wherein each of the N up thresholds is corresponding to each of the N low thresholds, and wherein each of the N up thresholds is higher than each of the N low thresholds correspondingly, and wherein N is a positive integer and is larger than or equal to 2, and wherein when the resonant converter operates in the inductive mode, the control circuit is configured to compare a setting voltage signal across the setting capacitor with the largest one of the N up thresholds, and with the smallest one of the N low thresholds in each switching cycle to generate a high-side control signal and a low-side control signal used for controlling the high-side switch and the low-side switch, wherein the operation cycle comprises one or more switching cycles of the resonant converter, and wherein when the resonant converter enters into the capacitive mode, the control circuit is configured to compare the setting voltage signal with each of the N up thresholds operation cycle by operation cycle, and compared with each of the N low thresholds operation cycle by operation cycle, and wherein the control circuit is further configured to change a switching frequency of the resonant converter by varying the N up thresholds and the N low thresholds.

20. The resonant converter of claim 19, wherein both the high-side control signal and the low-side control signal respectively have a first logic state and a second logic state, and wherein when the setting voltage signal is higher than one of the N up thresholds, the high-side control signal changes from the second logic state to the first logic state, and the low-side control signal changes from the first logic state to the second logic state; and wherein when the setting voltage signal is lower than one of the N low thresholds, the high-side control signal changes from the first logic state to the second logic state, and the second logic state of the low-side control signal changes from the second logic state to the first logic state.

* * * * *